(12) United States Patent
Ghosh et al.

(10) Patent No.: US 7,782,319 B2
(45) Date of Patent: Aug. 24, 2010

(54) THREE-DIMENSIONAL ORIENTATION INDICATOR AND CONTROLLER

(75) Inventors: Anirban Ghosh, Toronto (CA); Igor Mordatch, Toronto (CA); Azam Khan, Aurora (CA); George William Fitzmaurice, Toronto (CA); Justin Frank Matejka, Etobicoke (CA); Ryan M. Schmidt, Toronto (CA); Gordon P. Kurtenbach, Toronto (CA)

(73) Assignee: Autodesk, Inc., San Rafael, CA (US)

( * ) Notice: Subject to any disclaimer, the term of this patent is extended or adjusted under 35 U.S.C. 154(b) by 709 days.

(21) Appl. No.: 11/729,211

(22) Filed: Mar. 28, 2007

(65) Prior Publication Data

US 2008/0238916 A1      Oct. 2, 2008

(51) Int. Cl.
*G06T 15/00* (2006.01)
(52) U.S. Cl. .................. 345/427; 345/419; 345/649; 345/650; 715/720; 715/848; 715/852; 715/860
(58) Field of Classification Search ................ 345/419, 345/427, 619, 649, 650; 715/720, 848, 849, 715/850, 852, 860
See application file for complete search history.

(56) References Cited

U.S. PATENT DOCUMENTS

| 5,734,805 | A | * | 3/1998 | Isensee et al. ............... 345/419 |
| 6,907,579 | B2 | * | 6/2005 | Chang ....................... 715/850 |
| 2005/0028111 | A1 | | 2/2005 | Schrag et al. |

OTHER PUBLICATIONS

Balakrishnan, R. et al., "Exploring bimanual camera control and object manipulation in 3D graphics interfaces," In Proc. of ACM CHI, pp. 56-63 (1999).
Bares, W. et al., "Generating Virtual Camera Compositions," In Proceedings of ACM IUI'01, pp. 9-12 (2001).
Bares, W. et al., "Intelligent Multi-Shot Visualization Interfaces for Dynamic 3D Worlds," Proceedings of ACM IUI '99, pp. 119-126 (1999).
Baudisch, P., et al., "Snap-and-go: helping users align objects without the modality of traditional snapping," In ACM Proceedings of the SIGCHI Conference on Human Factors in Computing Systems, CHI '05, pp. 301-310 (2005).
Bier, E. A., "Snap-dragging in three dimensions," In ACM Proceedings of the 1990 Symposium on interactive 3D Graphics, pp. 193-204 (1990).
Bowman, D., et al., "Testbed environment of virtual environment interaction," In Proceedings of ACM VRST. pp. 26-33 (1999).

(Continued)

*Primary Examiner*—Phu Nguyen
(74) *Attorney, Agent, or Firm*—Gates & Cooper LLP

(57) ABSTRACT

A method, apparatus, and article of manufacture provide the ability to control a three-dimensional scene view. A three-dimensional (3D) scene having one or more three-dimensional objects is displayed. A 3D representation of a coordinate system of the scene is displayed. The 3D representation contains a current viewpoint, one or more faces, one or more edges, and one or more corners with each face, edge, and corner representing a corresponding viewpoint of the scene. The 3D representation is manipulated. A new current viewpoint of the 3D representation is displayed based on the manipulation. The scene is then reoriented corresponding to the new current viewpoint based on the manipulation of the 3D representation.

30 Claims, 11 Drawing Sheets

OTHER PUBLICATIONS

Bowman, D., et al., "Travel in immersive virtual environments," IEEE VRAIS'97 Virtual Reality Annual International Symposium. pp. 45-52 (1997).

Burtnyk, N., et al., "StyleCam: Interactive Stylized 3D Navigation using integrated Spatial and Temporal Controls," In Proceedings of ACM UIST 2002, pp. 101-110 (2002).

Burtnyk, N. et al., "ShowMotion: camera motion based 3D design review," In Proceedings of the 2006 Symposium on interactive 3D Graphics and Games, SI3D '06, pp. 167-174 (2006).

Chapuis, O. et al., "Metisse is not a 3D desktop!," In Proceedings of the 18th Annual ACM Symposium on User interface Software and Technology, UIST '05, pp. 13-22 (2005).

Chittaro, L. et al., "3D location-pointing as a navigation aid in Virtual Environments," In ACM Proceedings of the Working Conference on Advanced Visual interfaces (Gallipoli, Italy, May 25-28, 2004). AVI '04, pp. 267-274 (2004).

Christianson, D.B., et al., "Declarative camera control for automatic cinematography," Proceedings of AAAI '96 (Portland, OR), pp. 148-155 (1996).

Drucker, S. et al., "CamDroid: A System for Implementing Intelligent Camera Control," In Proceedings of ACM Symposium on Interactive 3D Graphics, pp. 139-144 (1995).

Galyean, T., "Guided navigation of virtual environments," ACM Symposium on Interactive 3D Graphics. pp. 103-104 (1995).

Gliecher, M., et al., "Through-the-lens camera control," ACM SIGGRAPH 92. pp. 331-340 (1992).

Grossman, T., et al., "Interaction techniques for 3D modeling on large displays," In Proceedings of the 2001 Symposium on interactive 3D Graphics SI3D '01, pp. 17-23 (2001).

Hanson, A. et al., "Constrained 3D navigation with 2D controllers," IEEE Visulization. pp. 175-182 (1997).

He, L., et al., "The virtual cinematographer: a paradigm for automatic real-time camera control and directing," ACM SIGGRAPH 96. pp. 217-224 (1996).

Igarashi, T. et al., "Path drawing for 3D walkthrough," ACM UIST. pp. 173-174 (1998).

Jul, S., et al., "Critical zones in desert fog: aids to multiscale navigation," ACM Symposium on User Interface Software and Technology. pp. 97-106 (1998).

Khan, A. et al., "HoverCam: interactive 3D navigation for proximal object inspection," In Proceedings of ACM Symposium on Interactive 3D graphics and games, pp. 73-80 (2005).

Komerska, R. et al., "Haptic-GeoZui3D: Exploring the Use of Haptics in AUV Path Planning," Proceedings 13th International Symposium on Unmanned Untethered Submersible Technology (UUST'03), Durham, NH (2003).

MacKinlay, J., et al., "Rapid controlled movement through a virtual 3D workspace," ACM SIGGRAPH 90. pp. 171-176 (1990).

Phillips, C.B., et al., "Automatic Viewing Control for 3D Direct Manipulation," In ACM Proceedings of ACM Symposium on Interactive 3D Graphics, pp. 71-74 (1992).

Pierce, J. S., et al., "Toolspaces and glances: storing, accessing, and retrieving objects in 3D desktop applications," In ACM Proceedings of the 1999 Symposium on interactive 3D Graphics, SI3D, pp. 163-168 (1999).

Rezzonico, S. et al., "Browsing 3D Bookmarks in BED," WebNet 1996.

Robertson, G., et al., "The cognitive coprocessor architecture for interactive user interfaces," In Proceedings of ACM UIST 1989, pp. 10-18 (1989).

Singh, K. et al., "Visualizing 3D Scenes using Non-Linear Projections and Data Mining of Previous Camera Moves," In Proceedings of ACM Computer Graphics, Virtual Reality, Visualization and Interaction in Africa, pp. 41-48 (2004).

Smith, G., et al., "3D Scene Manipulation with 2D Devices and Constraints," Proceedings of Graphics Interface, pp. 135-142 (2001).

Steed, A., "Efficient navigation around complex virtual environments," ACM VRST. pp. 173-180 (1997).

Stoakley, R., et al., "Virtual reality on a WIM: Interactive worlds in miniature," ACM CHI. pp. 265-272 (1995).

Stoev, S.L. et al., "A Case Study on Automatic Camera Placement and Motion for Visualizing Historical Data," Proceedings of IEEE Visualization, pp. 545-558 (2002).

Tan, D., et al., "Exploring 3D navigation: combining speed-coupled flying with orbiting," ACM CHI. pp. 418-425 (2001).

Tory, M., Mental Registration of 2D and 3D Visualizations (An Empirical Study). In Proceedings of the 14th IEEE Visualization 2003 (Vis'03) pp. 371-378 (2003).

Tory, M. et al., "Comparing ExoVis, Orientation Icon, and In-Place 3D Visualization Techniques," In Proceedings of Graphics Interface, pp. 57-64 (2003).

Tory, M., et al., "Combining 2D and 3D views for orientation and relative position tasks," In ACM Proceedings of the SIGCHI Conference on Human Factors in Computing Systems, CHI '04, pp. 73-80 (2004).

Wan, M., et al., "Distance-Field Based Skeletons for Virtual Navigation," IEEE Visualization 2001. pp. 239-245 (2001).

Ware, C. et al., "Context sensitive flying interface," ACM Symposium on Interactive 3D Graphics. pp. 127-130 (1997).

Ware, C. et al., "Exploration and virtual camera control in virtual three dimensional environments," ACM Symposium on Interactive 3D Graphics. pp. 175-183 (1990).

Zeleznik, R. et al., "UniCam—2D Gestural Camera Controls for 3D Environments," ACM Symposium on Interactive 3D Graphics. 169-173 (1999).

Zeleznik, R., et al., "Two pointer input for 3D interaction," ACM Symposium on Interactive 3D Graphics. pp. 115-120 (1997).

* cited by examiner

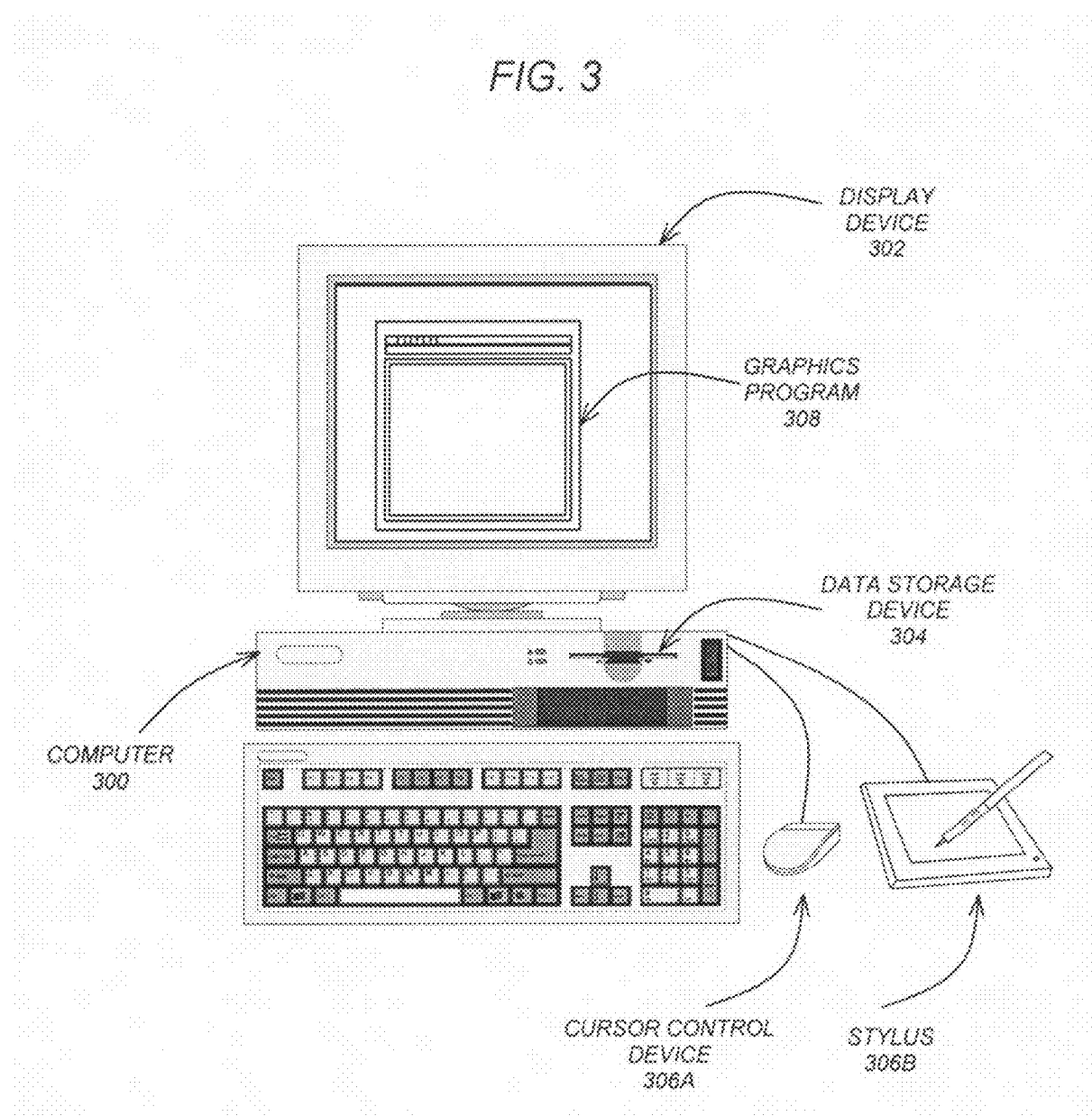

THREE-DIMENSIONAL ORIENTATION INDICATOR AND CONTROLLER

CROSS-REFERENCE TO RELATED APPLICATIONS

This application is related to the following co-pending and commonly-assigned patent application, which application is incorporated by reference herein:

U.S. patent application Ser. No. 10/627,974, entitled "3D SCENE ORIENTATION INDICATOR SYSTEM WITH SCENE ORIENTATION CHANGE CAPABILITY", by John Schrag and Takashi Watanabe, et. al., filed on Jul. 28, 2003.

BACKGROUND OF THE INVENTION

1. Field of the Invention

The present invention relates generally to three-dimensional (3D) graphics applications, and in particular, to a method, apparatus, and article of manufacture for providing access to multiple views using a single orientation/controller widget.

2. Description of the Related Art (Note: This application references a number of different publications as indicated throughout the specification by reference numbers enclosed in brackets, e.g., [x]. A list of these different publications ordered according to these reference numbers can be found below in the section entitled "References." Each of these publications is incorporated by reference herein.)

When working with three-dimensional (3D) data (i.e., in a graphics application), a number of orientations of the data are needed by the user to provide a better understanding of the shape and size of the geometry being viewed. Accessing a number of views of the data is difficult and involves several user steps with prior art methods. What is needed is a method and capability to easily view multiple different orientations of the 3D data. Such problems may be better understood with an explanation of prior art graphics applications and orientation view capabilities.

Typical 3D authoring applications allow users to create, manipulate, and view 3D geometry on two-dimensional displays. By rendering a view of the virtual scene from a particular viewpoint, a 2D image can be shown on the display. While this allows a rich and effective means of simulating the experience of viewing real 3D objects and scenes, controlling the viewpoint and understanding the position of the viewpoint relative to the object is a significant task for the user.

Early primitive 3D graphics applications were command line driven, allowing users to directly enter and query the numerical position, orientation, and other properties of a virtual camera which defined a particular viewpoint. With the advent of graphical user interfaces (GUIs), numerical entry and query were largely replaced by graphical representations of the 3D camera in the scene and direct manipulation of it either while viewing through the camera or while looking at it through another camera. In addition, preset viewpoints commonly used in the drafting and design fields, such as "top view", "side view", etc., could be selected through menus. However, there are many shortcomings to this approach and more advanced scene orientation methods are possible.

The prior art de facto standard interface for commercial 3D software applications is a four-window system with Top, Front, Side, and Perspective views as illustrated in FIG. 1. Thus, FIG. 1 illustrates a standard four-view 3D modeling interface with (clockwise from top-left) top, perspective, side, and front views. Typically, for modeling programs, the Top, Front, and Side views are drawn with an orthographic projection onto the viewing plane, and the Perspective view (also called a "three-quarter" view) is typically drawn with a perspective projection.

The layout illustrated in FIG. 1 has some costs. First, it clearly imposes highly divided attention, even for expert users. Second, the main viewing area is quartered making the model much smaller, and so, harder to work with. Third, there are many fixed-views sets which may be useful and the choice of which four to show may not be the best.

More recently, efforts have been made in commercial 3D software to better support "single-window" displays and interaction where users can choose to work in only one window, changing their viewpoint as needed.

It has become more common for 3D data to replace 2D blueprint-style plans and drawings. Users such as building contractors, construction supervisors, and engineering purchasing agents now need to regularly review 3D data. However, these users do not generally wish to invest much time into the significant learning and practice needed to operate complex 3D applications and their camera control techniques.

During their first encounters with 3D modeling applications, experienced 2D software users are often confused and misinterpret 3D scenes. For example, if first shown a perspective view of a box (similar to the Perspective view in FIG. 1), and then shown a side view of the box (without any animated rotation between the two views), users often misinterpret the results. Such users may suggest that their box disappeared or that only a square is visible. Thus, users are often confounded by their familiarity with 2D images (e.g., from a 2D graphics application such as Illustrator™ or Photoshop™) and have a difficult time understanding and realizing that there are hidden elements in the depth dimension. If users are informed (or realize) that an object is three-dimensional, the user may request different views of the object not by traditional view naming conventions like "front view" or "bird's eye view", etc., but by spatial relationships relative to their current view. For the box example, users may state the desire "to look at the side around the edge" or "go around to the back side."

3D Navigation

A great body of research has studied the issue of efficiently navigating around complex 3D virtual environments. For example, the present invention may require standard mouse and keyboard input and many approaches and metaphors have been developed for these requirements. The most pervasive is the cinematic camera model, enabling users to rotate, pan and zoom the viewpoint. Researchers have also explored other camera metaphors including orbiting and flying [34], using constraints [24, 30, 17], drawing a path [20], through-the-lens control [15], points and areas of interests [21], two-handed techniques [1, 42], and combinations of techniques [29, 31, 41]. Bowman et al. present taxonomies and evaluations of various interactions and camera models [6, 7]. A variety of metaphors have been explored for navigating in a virtual environment such as "eyeball", "scene in hand", and "flying" [40].

Some systems use constraints and pre-authored orientation and navigation to simplify the user experience. The metaphor of a guided tour [14] has been explored to pre-author camera paths and to signal interesting viewing vistas. StyleCam [8] takes this a step further by blending pre-authored elements and free-form navigation while introducing cinematic effects. The ShowMotion system [9] replaces static views with moving "shots" interspersed with cinematic visual transitions for repeatable motion-based 3D design reviews and improved 3D object comprehension.

Rules can be defined for cameras to automatically frame a scene that follow cinematic principles such as keeping the virtual actors visible in the scene or following the lead actor [12, 18, 3, 2]. Automatic path planning algorithms [38, 33, 13] have also been used for virtual navigation as well as finding effective viewing angles for 3D direct manipulation [25].

Camera techniques that use continuous depth sampling to modulate the flying speed in virtual environments have been studied [39]. Similarly, techniques such as HoverCam orbit objects at a constant distance and face the object's surface [22].

View Switching

Many commercial 3D software applications support the notion of multiple views of an object, such as side/top/back views, where a separate window is dedicated to a particular view. Displaying a particular view happens by selecting the view's name from a menu or by popping up the views window on top of the window display heap using some sort of window management user interface technique. Multiple workspaces have also been managed by introducing a room metaphor [19, 10].

Toolspaces [26] are storage spaces attached to the user's virtual body where objects or views can be placed that are always accessible yet out of the user's view until needed. Users access these toolspaces to store and retrieve objects through a lightweight but rapid navigational glance.

With the ExoVis technique, a 3D object is surrounded by 2D orthographic views (e.g., front, top, left) which are projected onto planes surrounding the 3D object. Thus, multiple 2D and the 3D perspective views are available simultaneously and within the same 3D space for improved view integration [35, 36, 37].

Early 3D VRML environments [27] offer "3D bookmarks". The animated transitions between bookmark views, known as object constancy [28], reduces the need to re-assimilate the material once at the new view because the user saw "how they got there", hence assisting orientation tasks.

To facilitate the realization that objects have depth, Grossman et al. [16] introduced animated rotation transitions between the different views in the VRML bookmarks fashion. If the current and target views were not both using the same view projection, the projection matrix was manipulated to more smoothly transition between orthographic and perspective views.

Other related work is the UniCam [41] click-to-focus [24] feature and the Tan et al. [34] navigation system. Both of these systems are suites of camera manipulation tools and both have one feature that examines the in-scene geometry. Once the user has clicked on an object of interest, a camera path is generated to move and orient the system, animates the view to the new position while the Tan system uses keyboard keys to move along the generated path.

The use of in-scene 3D widgets within the 3D workspace can facilitate 3D navigation tasks. Selectable "3D arrows" [11] point to objects of interest in the scene and, if selected, take the user to the target. The 3D arrows update and re-orientate as the user moves through the space or if the target moves. Within GeoZui3D [23] a "scene navigation widget" provides a 3D manipulator for the user with the ability to translate, rotate and scale the 3D scene about the center of the workspace.

Other work includes miniature overviews—"Worlds in Miniature" (or WIM) [32]. A WIM approach is directed towards immersive head tracked display environments and augments the display of 3D scene with a miniature copy of the scene which the user can "hold in their hand" and they control their viewpoint on the 3D scene by selecting locations on the miniature copy. However, such an approach is not concerned with desktop virtual environments operated with standard mouse and keyboard. In addition, such an approach requires the use of a literal miniature duplicate of the 3D scene.

Commercial Tools

In the commercial 3D application Maya™ (available from the assignee of the present invention), an in-scene widget called the ViewCompass™ provides more direct viewpoint selection, effectively replacing a small pull-down menu. As illustrated in FIG. 2, the standard views 202 are accessible on the ViewCompass™ 204 where users can click the cones to view the scene from that point of view. Clicking the cube 206 itself would move the camera to the standard three-quarter view with a perspective projection.

The ViewCompass™ is composed of a small cube 206 in the scene that represents the current orientation of the scene, along with six cones 208 pointing toward the faces of the cube 206. By clicking on the cone-shaped buttons 208 spatially associated with the faces of the cube 206, the virtual camera will turn to view that face, and both the model and the widget turn together during the animated transition. When clicking directly on the cube part 206 of the ViewCompass™, the camera moves to the standard three-quarter view (see top-right of FIG. 1) regardless of which cube face was clicked. Users report that this "return to the standard view" functionality is useful as an orientation recovery mechanism when the user becomes disoriented in the 3D scene.

Maya's ViewCompass™ works towards the single-window workflow goal, avoiding the standard four-view approach by providing six standard orthographic views and one perspective view. However, both engineering and architecture users have additional needs. For these classes of users, so-called "half views" (e.g. Front-Right) and additional "three-quarter views" (e.g. Top-Right-Back) are fundamental to the user's workflow. As such, in typical 3D engineering applications, the standard-views menu is significantly longer, often with a dozen views from which to choose. Including all of the "half" and "three-quarter" views with the six standard "face" views introduces an unwieldy total of twenty-six views as illustrated in Table 1.

TABLE 1

Back
Front
Bottom
Top
Right
Left
Back Bottom
Back Top
Back Right
Back Left
Front Bottom
Front Top
Front Right
Front Left
Bottom Right
Bottom Left
Top Right
Top Left
Back Right Bottom
Back Left Bottom
Back Right Top
Back Left Top
Front Right Bottom
Front Left Bottom
Front Right Top
Front Left Top Autodesk's Inventor™ product, for Computer Aided Design (CAD) users, has an in-scene widget, called "the Glass Cube," that adds eight more viewpoints. Like the ViewCompass™, faces can be selected to move to that viewpoint. However, the corners of the Glass Cube can also be clicked on to move the viewpoint to a three-quarter view, providing a total of fourteen views. Also different from the ViewCompass™, the Glass Cube fills a large part of the center of the screen, and as it is semi-transparent, is effectively in front of the object or scene. The Glass Cube is not modeless. Users must invoke the widget by going to the Orbit tool, and once they have oriented the scene as desired, selecting a different tool will remove the Glass Cube. Neither edge-viewpoints nor dragging are provided by the Glass Cube.

Overview of Prior Art

As described above, one may note that prior art 3D modeling applications typically present a user with multiple windows of different viewpoints of an option which is front, side and perspective, to aid in perceiving and editing a 3D object. Such a multi-window display consumes screen space and divides attention resulting in multiple small work areas for the user. Additional prior art approaches use a large, single window that can be switched to different views. Typically, view switching is performed by selecting a view from a linear list of views. User comprehension of the spatial relationships between the views can be approved by adding animated transitions. However, if one wishes to support combined viewpoints such as three-quarter views, for example, front, top, left, or half views, such as front right, a long list of 26 possible viewpoints is required.

Accordingly, what is needed is a mechanism for easily viewing and manipulating the view of all potential viewpoints in a manner that is not confusing to the user.

SUMMARY OF THE INVENTION

To overcome the deficiencies of the prior art, one or more embodiments of the invention provide a special way of representing twenty-six (26) viewpoints through an interactive widget called the CubeCompass™. The CubeCompass™ is a 3D widget displayed in any corner of the 3D window that displays and controls the current viewpoint on the model compressing access to all twenty-six (26) viewpoints into a small space, and shows the spatial relationship between these views. On face views of the cube, additional controls appear that allow quick access to orthogonal viewpoints. Curved arrows allow viewpoint roll control. A home button returns the user to a standard three-quarter view.

The cube compass design was evaluated by comparing its performance to the typical linear list of views found in commercial applications. Two major design variations of the cube compass may be utilized and tested in accordance with embodiments of the invention: (1) the click view, where a user clicks on the sides and corners of the cube to switch to those viewpoints; and (2) the drag cube, where the user drags a cube in an arc ball fashion to the desired viewpoint, and hybrid snapping and snap and go technique are used to read exact viewpoints. The effect of different types of viewpoint labeling schemes may also be utilized. Examples of different viewpoint labeling include text, 2D graphics and a 3D model. Experimental results indicate that subjects preferred and performed better with the drag cube design by a factor of two (2) times.

BRIEF DESCRIPTION OF THE DRAWINGS

Referring now to the drawings in which like reference numbers represent corresponding parts throughout:

FIG. 3 is an exemplary hardware and software environment used to implement one or more embodiments of the invention;

DETAILED DESCRIPTION OF THE PREFERRED EMBODIMENTS

Figure 1:
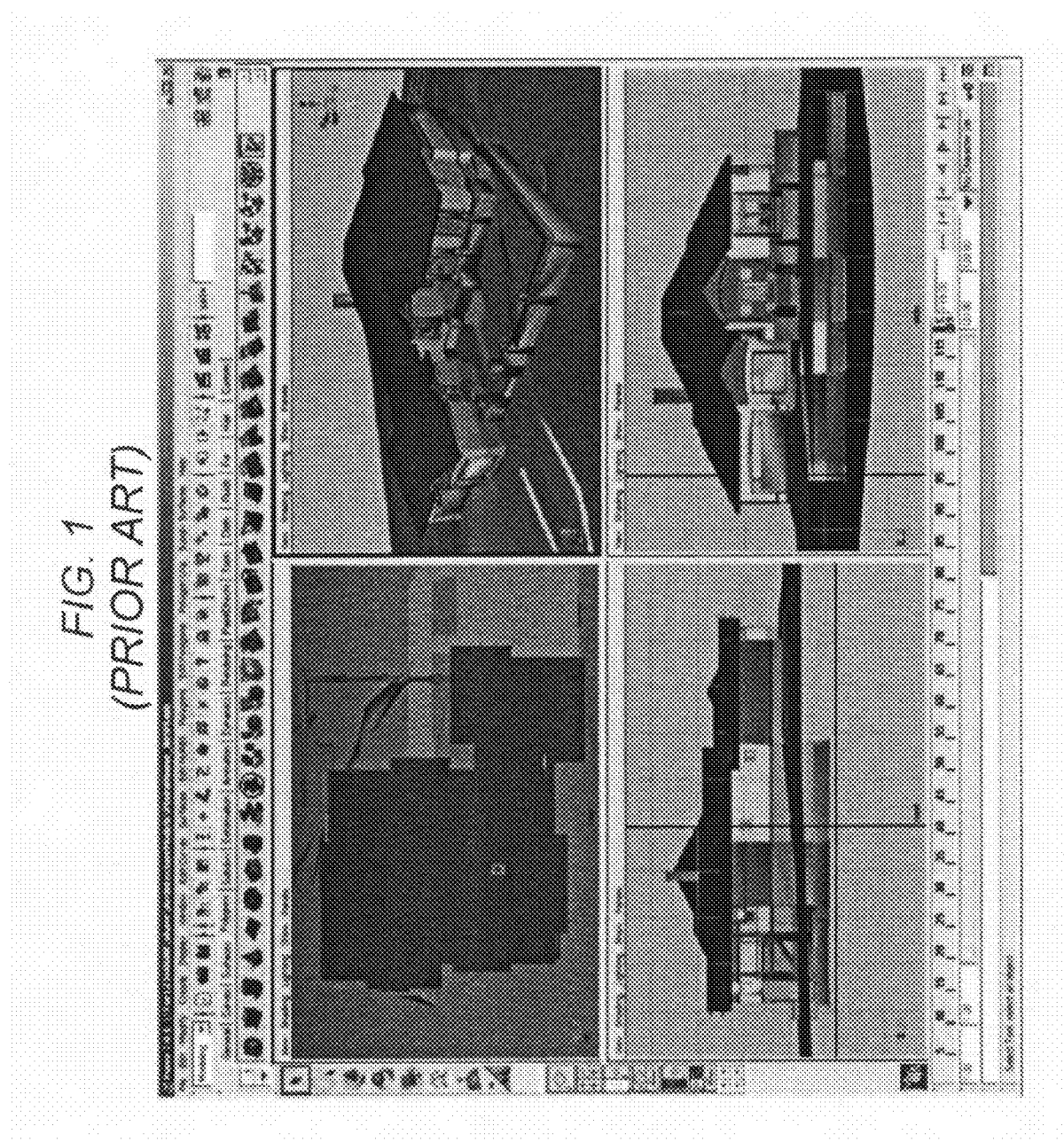
FIG. 1 illustrates a standard four-view 3D modeling interface of the prior art.

In the following description, reference is made to the accompanying drawings which form a part hereof, and which is shown, by way of illustration, several embodiments of the present invention. It is understood that other embodiments may be utilized and structural changes may be made without departing from the scope of the present invention.

Overview

To address all of the problems and user requirements stated above, the present invention provides a small representation of the coordinate system that can be manipulated with multiple views per face. An example of such a coordinate system representation is the CubeCompass™ that consists of a cube shaped widget with selectable pieces that spatially arranges twenty-six possible views. In this regard, the CubeCompass™ allows the user to select a ¾ view, six main views (i.e., front, top, right side, left side, back and bottom), the edges of such views/faces, and the corners of the cube for a total of twenty-six (26) different views. The cube can be easily manipulated to display the desired view as described in detail below. Further, the cube can be used to snap to any of the particular views.

Hardware Environment

FIG. 3 is an exemplary hardware and software environment used to implement one or more embodiments of the invention. Embodiments of the invention are typically implemented using a computer 300, which generally includes, inter alia, a display device 302, data storage devices 304, cursor control devices 306 (e.g., a cursor control device 306A such as a mouse or a tablet and stylus 306B), and other devices. Those skilled in the art will recognize that any combination of the above components, or any number of different components, peripherals, and other devices, may be used with the computer 300.

One or more embodiments of the invention are implemented by a computer-implemented graphics program 308, wherein the graphics program 308 is represented by a window displayed on the display device 302. Generally, the graphics program 308 comprises logic and/or data embodied in or readable from a device, media, carrier, or signal, e.g., one or more fixed and/or removable data storage devices 304 connected directly or indirectly to the computer 300, one or more remote devices coupled to the computer 300 via a data communications device, etc.

In one or more embodiments, instructions implementing the graphics program 308 are tangibly embodied in a computer-readable medium, e.g., data storage device 304, which could include one or more fixed or removable data storage devices, such as a zip drive, floppy disc drive, hard drive, CD-ROM drive, tape drive, etc. Further, the graphics program 308 is comprised of instructions which, when read and executed by the computer 300, causes the computer 300 to perform the steps necessary to implement and/or use the present invention. Graphics program 308 and/or operating instructions may also be tangibly embodied in a memory and/or data communications devices of computer 300, thereby making a computer program product or article of manufacture according to the invention. As such, the terms "article of manufacture" and "computer program product" as used herein are intended to encompass a computer program accessible from any computer readable device or media.

Those skilled in the art will recognize that the exemplary environment illustrated in FIG. 3 is not intended to limit the present invention. Indeed, those skilled in the art will recognize that other alternative environments may be used without departing from the scope of the present invention.

Software Embodiments

Figure 4:
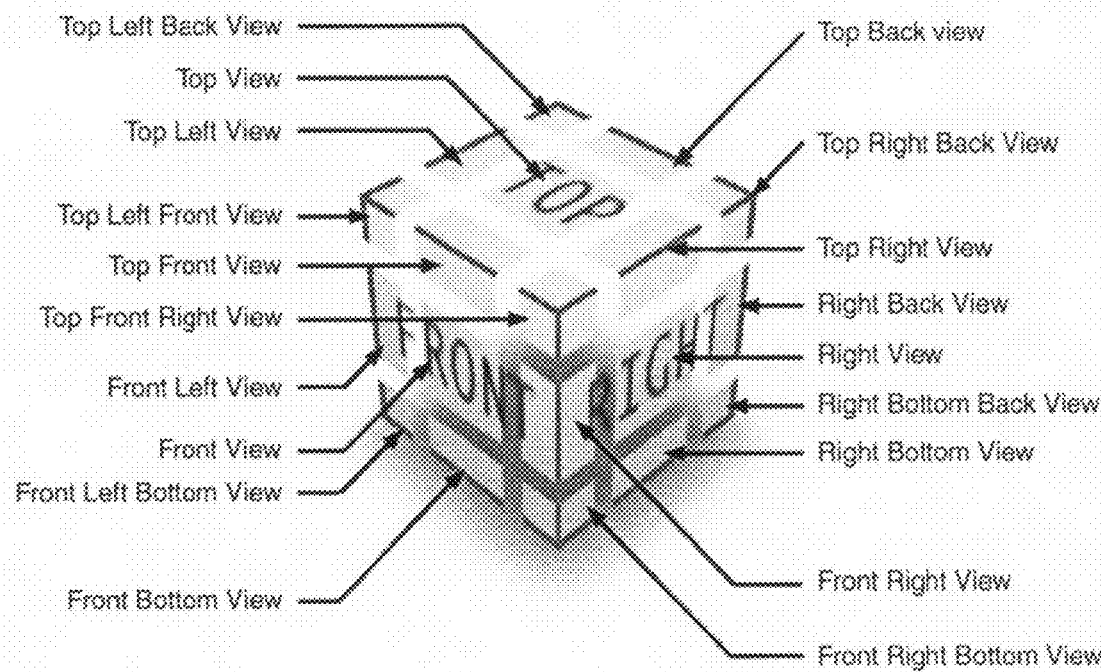
FIG. 4 illustrates a split view diagram of one or more embodiments of the invention.

The graphics program 308 of one or more embodiments of the invention is configured to provide a cube-shaped widget with selectable pieces that spatially arranges the twenty-six possible views. FIG. 4 illustrates a split view diagram of the CubeCompass™ from a ¾ view explicitly showing all currently selectable views. As illustrated, nineteen (19) views are accessible. Alternatively, a different shaped widget may be utilized as long as such a widget can accommodate the desired number of views. For example, a sphere, rectangular object, or a cube with the edges truncated (e.g., to create faces along the edge) may be used. In this regard, the desirable shape is one that provides the ability to establish a spatial correspondence between different viewpoints.

In addition, embodiments of the invention provide the ability for the widget to adjust itself proportionately to the content volume. For example, if the user is working on a skyscraper, the widget may adjust its size proportionally to accommodate the skyscraper (e.g., it becomes a rectangle). In this regard, the widget may morph its shape into the shape of a particular object or item in the scene that the user desires to manipulate. Such shape adaptability may be automatically performed without user input, interactively with the user input, or a hybrid (e.g., the user determines whether an adaptable shape option is active and the application automatically adjusts if such a setting is active).

Figures 5, 6:
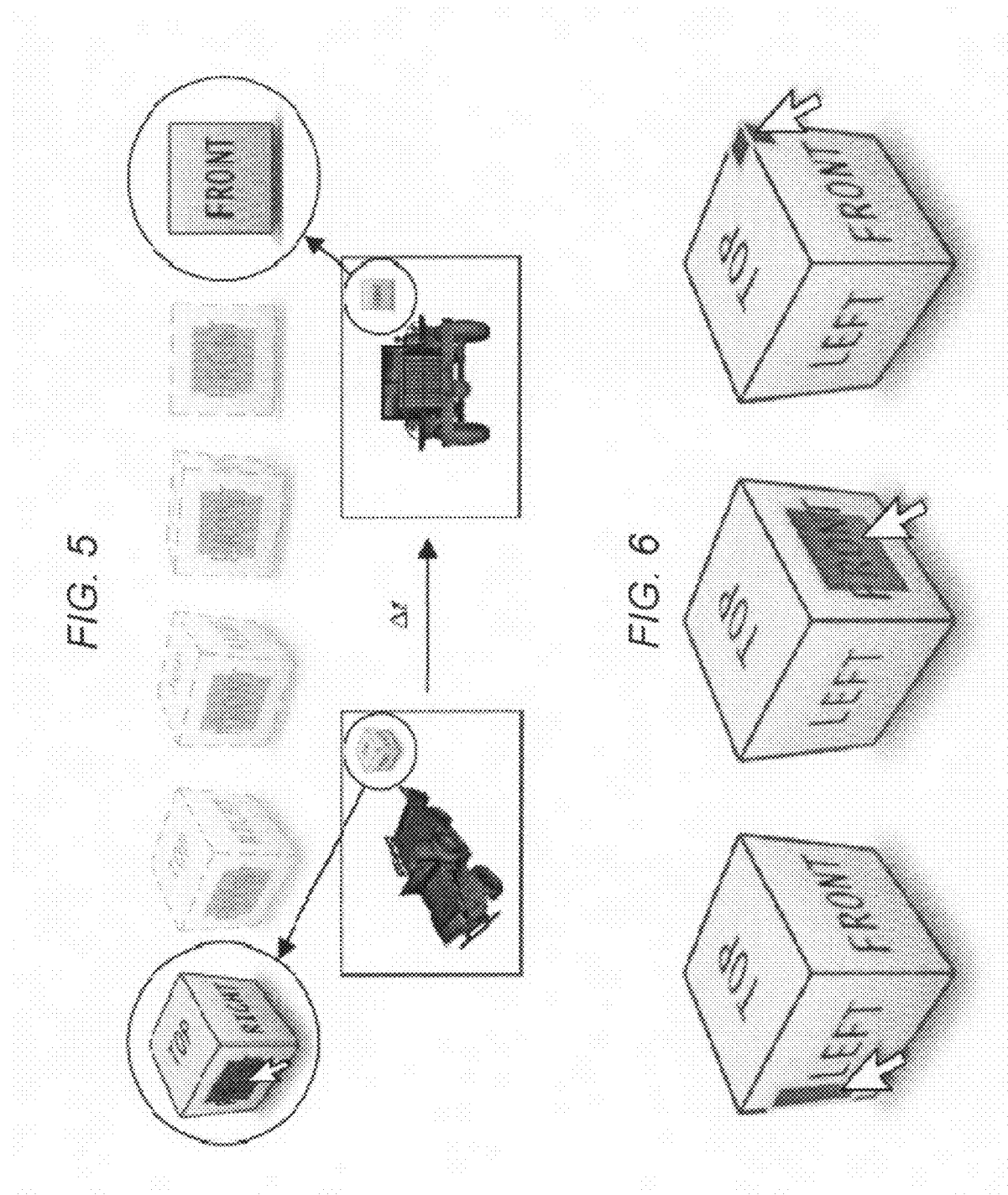
FIG. 5 illustrates the effect of clicking the "Front" button on a cube in accordance with one or more embodiments of the invention.
FIG. 6 illustrates selection feedback in accordance with one or more embodiments of the invention.

The CubeCompass™ maps the selectable views to a cube where the faces, edges and corners can be chosen as illustrated in FIG. 4. These separate regions are effectively buttons where clicking a piece activates the command to set the viewpoint appropriately. FIG. 5 illustrates the effect of clicking the "Front" button on the cube: the view of the model of the car and the view of the CubeCompass™ both animate (over 0.5 seconds) until the front of the car is facing the user. In this regard, clicking the "front" face of the cube rotates the cube and the 3D scene to the front view.

When inactive, the cube appears to be all one piece. So, to visually indicate which pieces of the cube are selectable, when the mouse pointer is above the cube, the part that would be selected if clicked is highlighted.

FIG. 6 illustrates CubeCompass™ selection feedback in accordance with one or more embodiments of the invention. As the cursor moves over the CubeCompass™, the piece that would be selected if the user clicked the mouse button is highlighted. Such highlighting is illustrated by the darkened color of the appropriate piece. However, consistent with embodiments of the invention, such highlighting may take a variety of forms that thereby distinguish the "highlighted" area from the remaining areas of the cube. For example, the highlighting could appear as a different color, different tone, different zoom effect, different transparency, larger font, etc. In yet another embodiment, all of the labels identified in FIG. 4 may be displayed in the form of a tooltip to assist the user in identifying the view that is being selected. Such a tooltip would be displayed in response to the cursor hovering, lingering, or remaining over a particular hit area for a predefined amount of time (i.e., a threshold time limit that may be custom defined by the user or predefined automatically by the application without user input).

Dragging

When users click on a piece of the cube to select that view, a quick animated rotation moves the scene and the cube to that view (see FIG. 1). However, since the total hit area of the cube is quite large, one or more embodiments of the invention also provides dragging. In this regard, both dragging or selection may be offered together or exclusively from one another in the invention. In a dragging operation, when the user clicks anywhere on the cube and begins to drag, the cube is rotated, along with the scene, providing freeform direct manipulation of the camera position.

Figure 7:
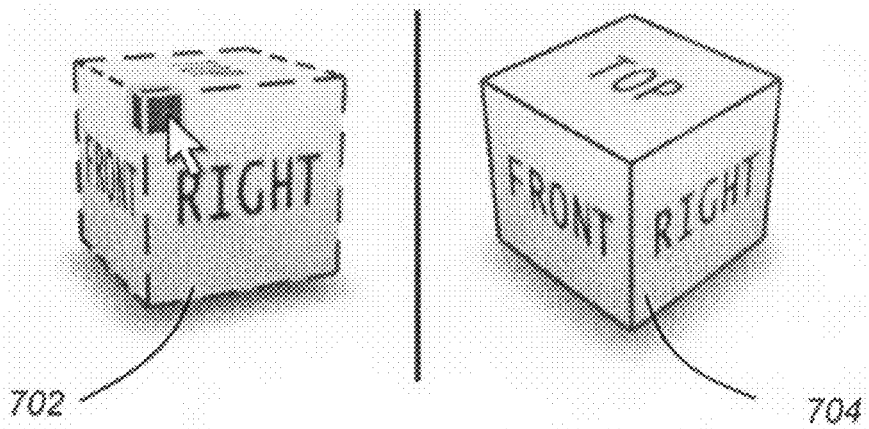
FIG. 7 illustrates the before and after effects of snapping in accordance with one or more embodiments of the invention.

During freeform orientation of the view while dragging on the CubeCompass™, it can be difficult to move exactly to one of the fixed views. As the cube's purpose is to select a fixed view, one or more embodiments of the invention provide view snapping. While being dragged, when the viewpoint is within 10° of any of the fixed viewpoints, the cube may snap to that view using snap-and-go [4, 5]. To help the user determine if they are currently exactly at one of the fixed twenty-six views, the outline of the cube may be drawn using a solid line instead of a dashed line. FIG. 7 illustrates the before 702 and after 704 effects of such snapping. In this regard, the dashed outline of 702 becomes solid in 704 to indicate that the camera is exactly at one of the fixed viewpoints (i.e., the ¾ view selected in 702).

Further, during a drag operation, a circle/sphere may be displayed around the cube. Alternatively, if dragging is enabled, whenever the user/cursor appears within a defined distance (i.e., a threshold or defined proximity distance), the circle may display to indicate the ability to use the dragging operation. In addition, when the user/cursor moves away from the cube, the circle/sphere may fade or disappear from the display.

In further embodiments of the invention, features of the cube may be enabled/disabled/displayed/not displayed based on the proximity of the cursor to the cube. For example, the cube may be semi-transparent with the degree of transparency varying depending on the proximity of the cursor to the cube. The colors of the cube could change depending on the cursor proximity or the labeling scheme of the cube may change (e.g., colors, size, font, etc.) depending on the proximity of the cursor to the cube.

Absolute Versus Relative Viewpoint Selection

Figure 2:
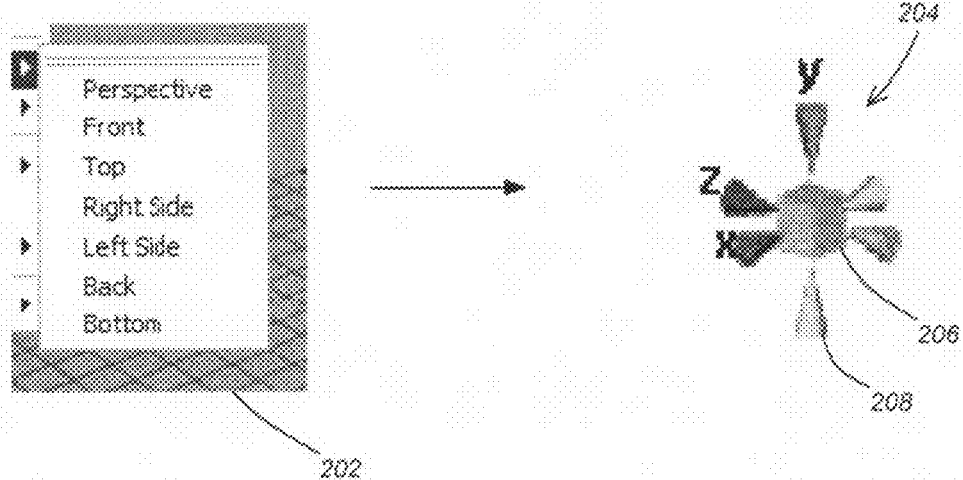
FIG. 2 illustrates a prior art menu used for view selection and a prior art ViewCompass.

In FIG. 2, a list of fixed viewpoints are presented in a menu. This could be called "absolute orientation selection" while the spatial arrangement of the viewpoint buttons of the cube design can be thought of as "relative orientation selection." For example, if the user decides to switch to the "Top" viewpoint, the viewpoint can be accessed directly in the list. However, on the CubeCompass™, the "Top" viewpoint may not be visible and the user would have to select an intermediate viewpoint first to "get to" the "Top" viewpoint to select it.

Absolute view selection has the benefit of being able to go to any view in one click, at the expense of finding the button in a long list and the large amount of screen space that the list consumes. The cost of the cube-based button layout is that it may take up to two clicks to select a viewpoint. However, the cube arrangement has the benefits of relative selection (i.e. it is clear which viewpoints are close to the current viewpoint, which is difficult to determine when presented with a list of viewpoints) and it uses only a small amount of screen space. The extra-click cost may seem high but note that at least thirteen (13) (and as many as nineteen [19]) viewpoints are selectable on the cube at any given time in a single click, depending on its orientation. The remaining seven (7) to thirteen (13) views can be selected quickly, by dragging to rotate the cube around to the other side to the intended viewpoint, or by one additional click (if the first click is used to expose the hidden parts of the cube). In any case, considering object constancy, the additional travel of the second animated transition or the freeform rotation would increase overall shape understanding [28].

Reaching Orthogonal Views

Figure 8:
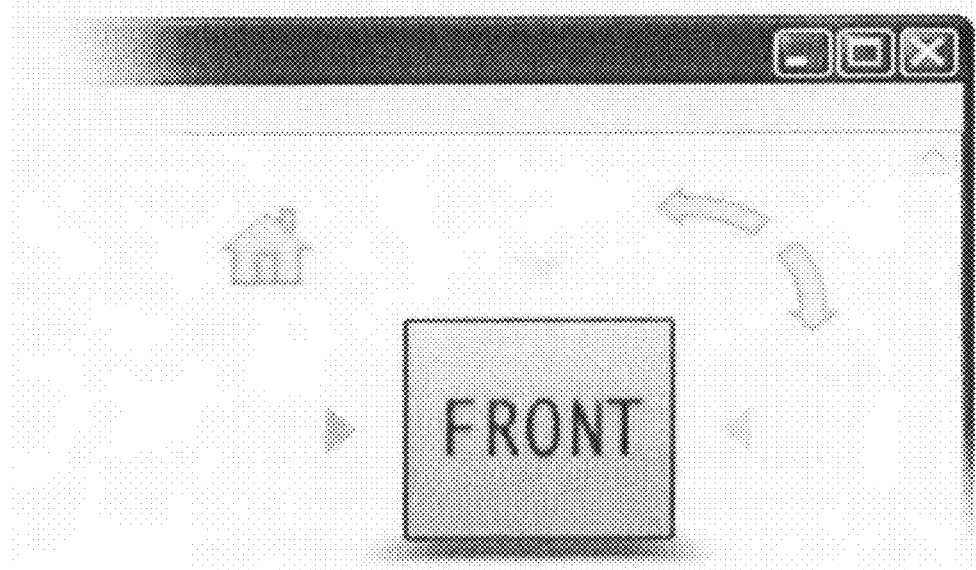
FIG. 8 illustrates a design of a 3D scene representation in accordance with one or more embodiments of the invention.

Switching from one face view, for example "Front", to another, like "Right", is quite common. However, when a CubeCompass™ face is directly facing the user (as in FIG. 8), the sides of the CubeCompass™ are not visible, and so, are not directly selectable. Accordingly, FIG. 8 illustrates a CubeCompass™ design wherein components consist of the large center cube with selectable faces, edges, and corners. Triangles point "around the edges" to orthogonal faces. A "home" button in the top-left returns the view to a default view (i.e., a user defined/pre-authored default view or an automated default view), and the "roll" arrows in the top-right rotate the cube in either a clockwise or counter-clockwise direction.

If dragging is not used, a situation results wherein moving from the Front view to the Right view would require two clicks; one click on the Front-Right edge and, once the Right face becomes visible, clicking the Right face. To remove this extra step, embodiments of the invention utilize a "ViewCompass" technique. The cones of the prior art ViewCompass are placed with triangles pointing to the orthogonal faces. Clicking on the triangle on the right side of the CubeCompass™ in FIG. 8 would rotate the scene and the cube to the Right view with a single click. Unlike the ViewCompass, the triangles of the present invention are only visible when directly on a face view. The CubeCompass™ can optionally show face views (or all views) orthographically or in perspective.

Figure 9:
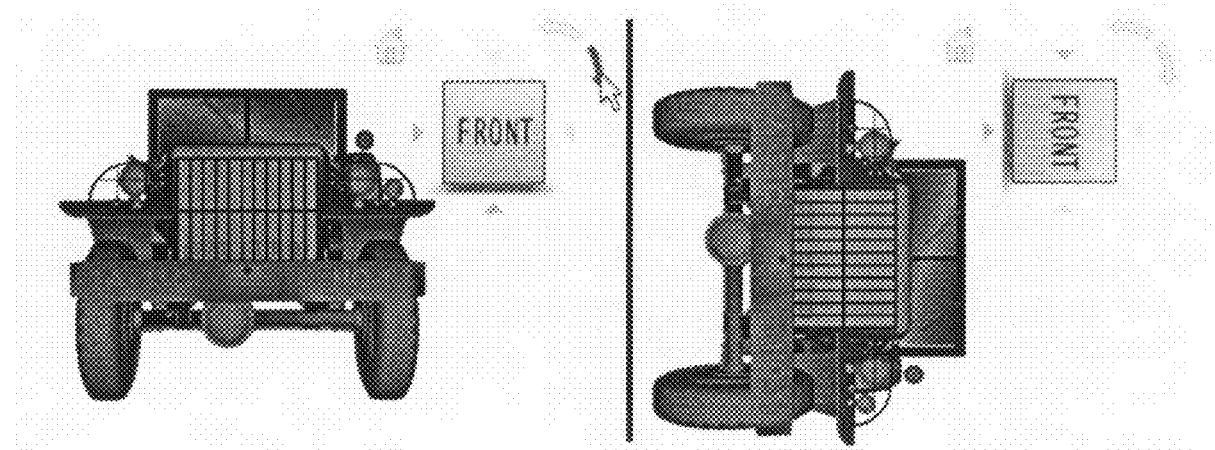
FIG. 9 illustrates a before (left) and after (right) result of a scene based on a use of a cube in accordance with one or more embodiments of the invention.

There are also two curved arrows to the top-right of the cube to support clockwise and counter-clockwise view "roll" rotation, (a desirable user need in the field of industrial design). As shown in FIG. 9, if the user clicks the bottom arrow, the scene and the cube are rotated 90° clockwise. This is especially useful for the top and bottom views where the "correct" orientation of a scene is often highly subjective. Accordingly, FIG. 9 illustrates a before (left) and after (right) result of a scene based on a use of the CubeCompass™. Clockwise and counter-clockwise controls are shown when at a face view. Clicking the bottom (clockwise) arrow rotates the scene and the cube 90°.

To minimize extra rotations when moving from one viewpoint to another, embodiments of the invention may utilize the local up model when moving to the top or bottom faces, and the global up model [22] in all other cases. Finally, to make the viewpoint "recovery" function of the CubeCompass™ more explicit, embodiments of the invention may utilize a "home" icon that is always accessible, shown above and left of the cube in FIG. 9. Clicking the "Home" button returns the view to the standard three-quarter view, or a pre-authored starting view.

Figure 10:
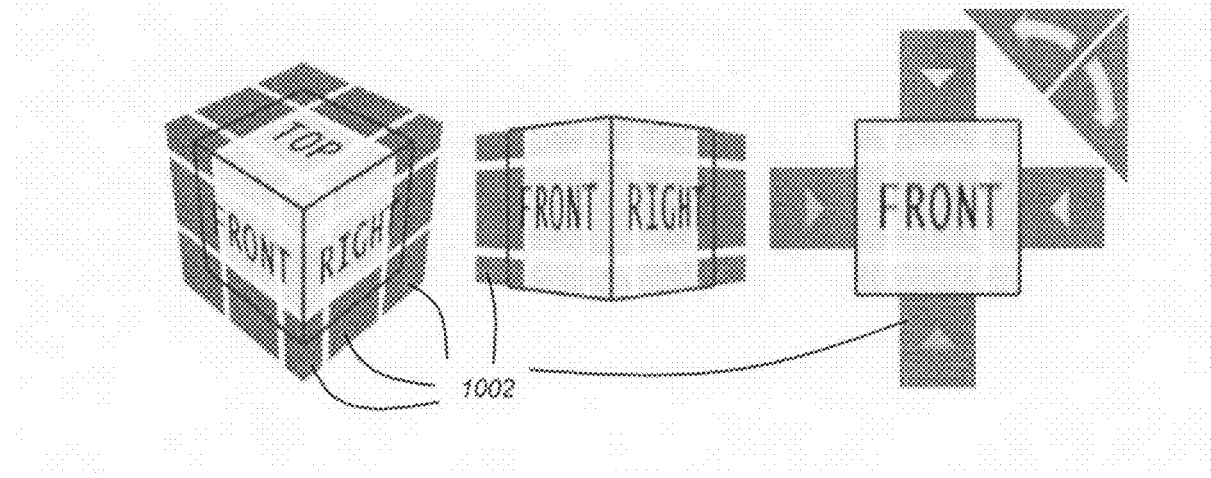
FIG. 10 illustrates expanded hit areas for boundary buttons and additional buttons in accordance with one or more embodiments of the invention.

While the face buttons are fairly large, the hit areas on the boundary of the cube can become quite small, especially when the view is quite oblique, which occurs when the cube is rotationally close to one of the fixed views. To help facilitate the selection of the boundary buttons, one or more embodiments of the invention algorithmically increase the hit zone areas in certain cases. FIG. 10 illustrates expanded hit areas for boundary buttons and additional buttons on the CubeCompass™. Clicking anywhere within a highlighted region 1002 will select the corresponding button. As illustrated, interior buttons are the same size as they appear to be but the boundary buttons are more than twice as large as they appear to be. During testing, it can be found that the (visually) smaller views are not difficult to select.

Alternatively, rather than using a cube, a small version of the real 3D model may be used in place of the cube. Further, the spatial correspondence of the elements in the cube may be decoupled such that the hit areas would be expanded and include the various labels identified in FIG. 4 (i.e., rather than just enlarging the hit area itself). The corners could also be removed and merely provide labels that appear for the user's selection.

Rendering

When the view has been rotated a number of times, it becomes more difficult to interpret the current orientation. While the text labels on the cube faces help, embodiments may utilize rendering queues such as the drop shadow beneath the cube, as though it was lit from the top, as well as a subtle gradation, from light blue to a darker blue, on the sides of the cube.

Figure 11:
FIG. 11 illustrates a house proxy image as used in Google's Sketchup™ application of the prior art.

Proxy-image labels for viewpoint switching are often used in commercial packages, of either a cube or a model. FIG. 11 illustrates a house proxy image as used in Google's Sketchup™ application. Text lists as illustrated in FIG. 2 are also common. However, as described above, these prior art approaches do not scale well to include all twenty-six views.

Figure 12:
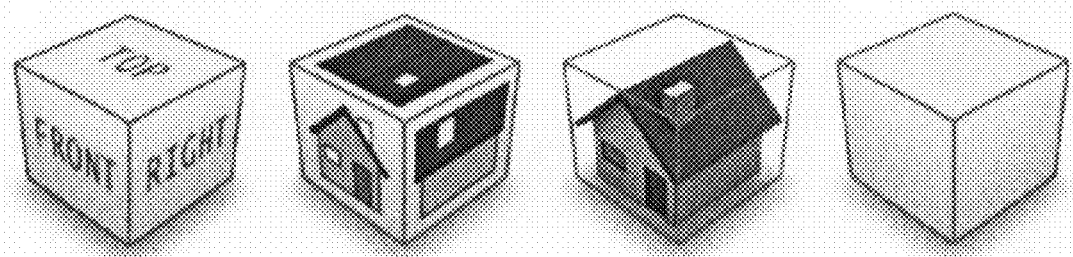
FIG. 12 illustrates different labeling schemes in accordance with one or more embodiments of the invention.

In view of the above, in addition to the text labels, one or more embodiments of the invention may utilize designs with 2D proxy labels and no labels. An alternative design may also contain a proxy model of a 3D house within the cube as illustrated in FIG. 12. In this regard, FIG. 12 illustrates different labeling schemes in accordance with one or more embodiments of the invention. As shown, the labeling schemes may include text, a 2D proxy image, a 3D proxy model, and/or no label. Each labeling scheme and interaction method has advantages and disadvantages as described in detail below.

Further, the labeling can be adaptive or change. In this regard, the orientation indicator labeling may provide for automated (i.e., without user input) or user defined graphics for the different sides/faces of the cube. Further, the labeling can be internationalized depending on the location of the user (which again may be automated without user input or can be user-defined). For example, if text labeling is utilized, German language text maybe utilized in Germany, a Chinese language symbol may be used in China (or Chinese speaking region/territory), etc. Customized content may also be placed in the cube.

CubeCompass In Situ

In the context of the whole 3D application, the CubeCompass™ may be placed in the top-right corner of the 3D window. However, embodiments may allow the user to select any corner for the cube's position. When the cursor is nearby, the CubeCompass™ is fully opaque but when the cursor leaves the area, the widget may fade to half opacity. Also, the additional triangles, roll arrows, and the home button may fade away completely when the cursor is distant. Such cube properties removes clutter so that the user can more easily monitor the cube orientation while working in the 3D window. When the user engages the application's orbit function to rotate the view of the scene, the CubeCompass™ rotates to match the view of the scene.

Figure 13:
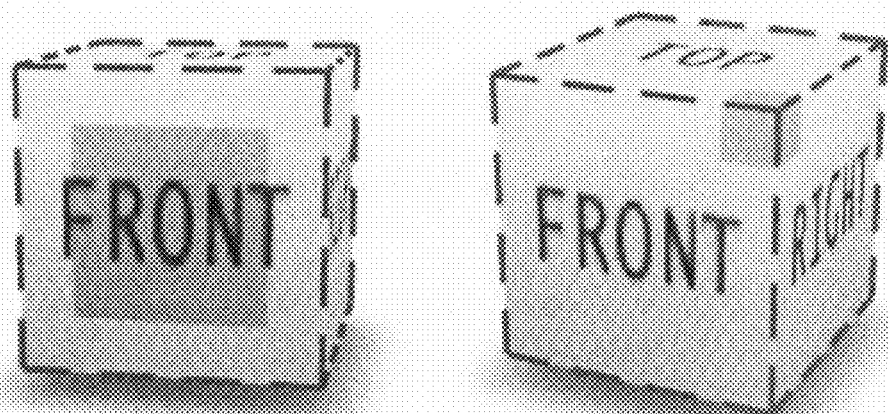
FIG. 13 illustrates the use of an orbit tool in accordance with one or more embodiments of the invention.

For additional feedback to the user, the piece of the CubeCompass™ that represents the fixed viewpoint that is closest to the current scene orientation may be highlighted. FIG. 13 illustrates that when the viewpoint is moved using the application's Orbit tool, the cube rotates to match the scene orientation. Further, the current closest fixed view is highlighted. In FIG. 13, the scene is orbited slightly from almost Front (left) to almost Front-Top-Right (right). As illustrated in FIG. 13, the closest fixed viewpoint to the scene orientation is highlighted.

As illustrated in FIG. 13, the user can easily see which piece of the cube to click on to quickly go exactly to the closest view, effectively to "fix up" or align the current viewpoint. Furthermore, the "closest view" feedback makes it easier to choose a neighboring fixed view to make relative viewpoint changes. For example, clicking on a piece of the cube that is a direct (edge-to-edge) neighbor to the current viewpoint may result in a small viewpoint change (45°) while clicking a piece far from the current viewpoint may result in a much larger turn (up to 180°). Without the "closest view" feedback, it is more difficult to judge how much of a viewpoint change will occur.

Figure 14:
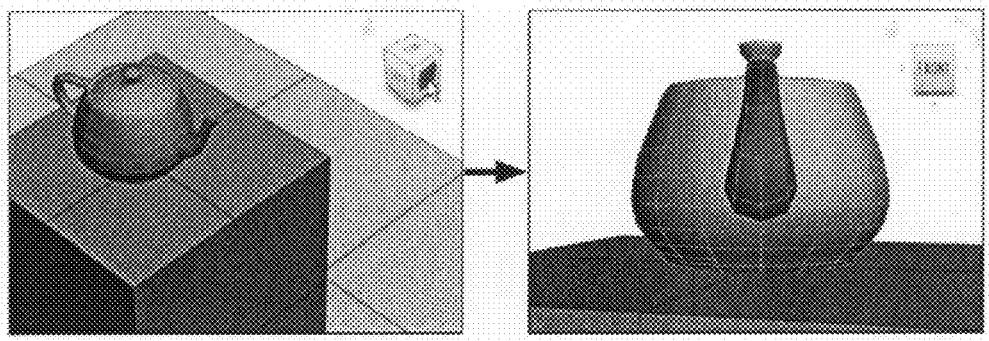
FIG. 14 illustrates orientation based on object selection in accordance with one or more embodiments of the invention.

The orientation of the entire 3D scene is described above. However, the CubeCompass™ may also be configured to move the current viewpoint to fixed views relative to the selected 3D object. That is, if no 3D objects in the scene are selected, selecting a viewpoint on the cube would orient the entire 3D scene to the fixed viewpoint that was selected and a "framing" step would ensure that the entire model fills the window. Such an action could zoom or pan as needed to "frame" the scene so that the entire scene was visible. However, if a 3D object in the scene was selected, the "framing" could be enabled such that it is relative to the selected object. FIG. 14 illustrates the orientation based on selection in accordance with one or more embodiments of the invention. When an object is selected, such as the teapot, and the Front viewpoint is selected on the CubeCompass™, the viewpoint is moved to the front of the teapot that is also framed to fill the window.

In addition to the above, embodiments may provide the ability for the CubeCompass™ to surround the entire model in a transparent manner (e.g., similar to a glass structure around the model) wherein the various hit areas may be manipulated or selected when in the appropriate mode (e.g., a viewing rather than a model editing mode).

User-Defined View

In accordance with one or more embodiments of the invention, the user is able to define a particular angle or view and associate that angle or view with a part of the cube. For example, the user is able to define what view of the scene is associated with the front view of the cube. In this regard, the user can orbit around in the 3D volume until the user has determined what the front view is and merely select/hit a command that defines the current view as the front view. Such a tool may be useful for circling an object located in the center of the view or when the user is navigating within a room/space and needs to align the user with an object that isn't orthogonal to the initial view.

In additional embodiments, the view may be defined with respect to a particular object in the scene. In this regard, when an object is selected in the scene, the CubeCompass™ may set its orientation to an object specific setting of the selected object. For example, if two cars are facing each other in a scene, when one car is selected, the front of the cube may orient itself to the front of that car. Further, if the other car is selected, the cube may rotate 180° to align its orientation with the second car's orientation. Deselecting everything may orient the cube to the overall orientation of the scene, whatever that has been defined as. Accordingly, the defined front or default view of the object is used to reorient the scene and cube whenever the object is selected.

Experimental Results

To help determine the benefits and costs of the various design choices described above, and to better understand how these methods scale from the six view case to the twenty-six views, formal experiments may and have been conducted.

The goal of such experiments is to measure the performance and subjective preference of the CubeCompass™ design while varying the labeling style and interaction model. In addition, the CubeCompass™ designs may be compared against traditional view switching mechanisms.

Design

The experimental design of one or more embodiments consists of three orientation interaction techniques, four labeling schemes and two difficulty levels.

Orientation Interaction Techniques

Figure 15:
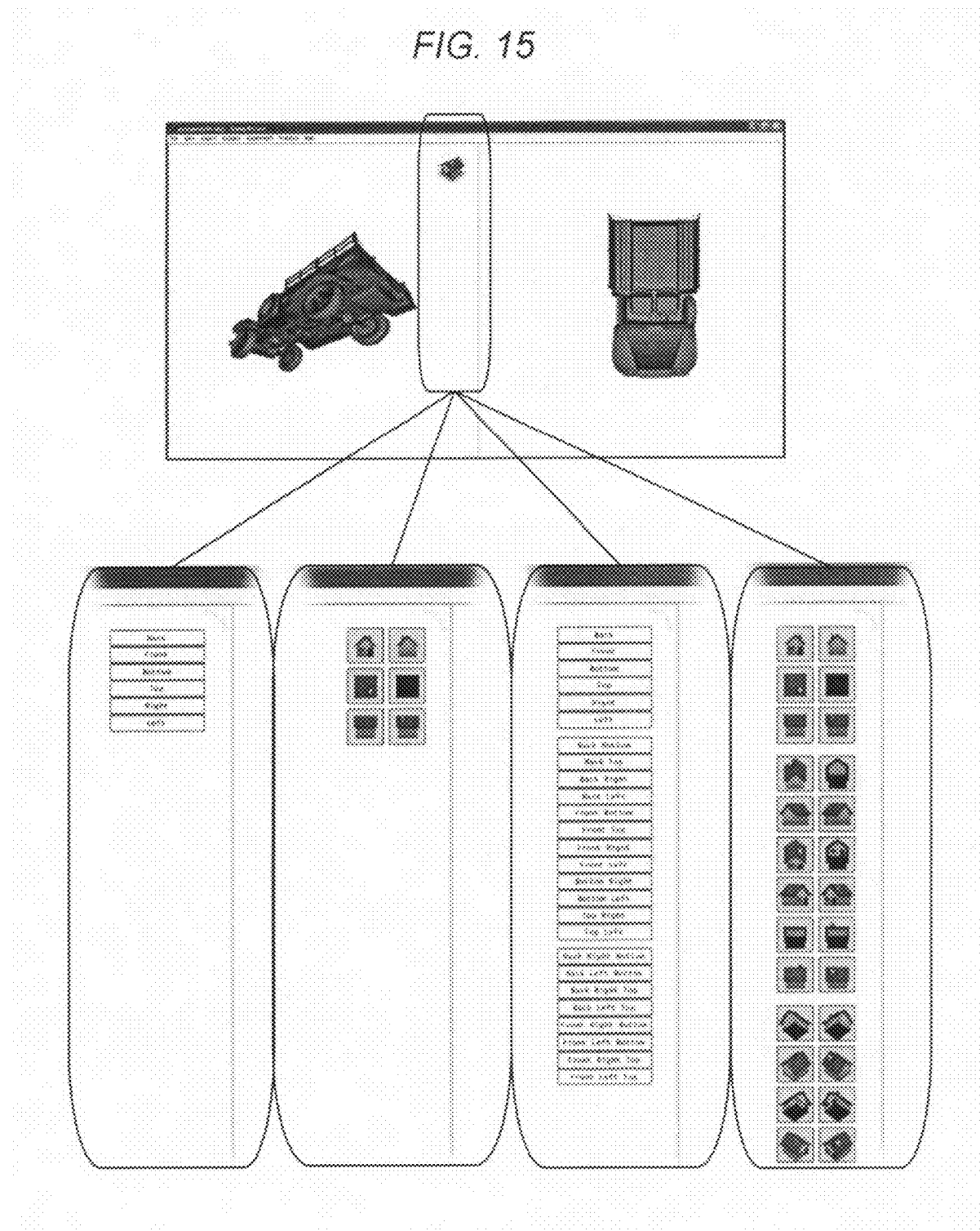
FIG. 15 illustrates an upper portion of an experiment screen and a bottom portion containing the List condition for (left to right) six (6) Views with Text Labels, six (6) Views with 2D Image Labels, twenty-six (26) Views with Text Labels, and twenty-six (26) Views with 2D Image Labels in accordance with one or more embodiments of the invention.

Specifically, three interaction techniques were studied consisting of (1) the ClickCube™—which takes only single mouse click inputs on the CubeCompass™' faces (and face triangles or roll arrows for orthogonal faces), edges and corners; (2) the DragCube™—which takes only mouse drag events on the cube performing an orbit operation with snapping to standard views and (3) the List—which presents an exhaustive collection of buttons to the user similar to a toolbar or items in a pop-up menu, as well as the roll arrows. FIG. 15 illustrates an upper portion of an experiment screen and a bottom portion containing the List condition for (left to right) six (6) Views with Text Labels, six (6) Views with 2D Image Labels, twenty-six (26) Views with Text Labels, and twenty-six (26) Views with 2D Image Labels. The area outlined shows how and where the various experiment conditions are displayed.

Both the ClickCube and List conditions animate the view transition to the target view after a ClickCube component (face, edge, or corner) or List button is selected, or any of the additional controls are selected (on mouse-up). The List technique represents the status-quo view switching mechanism.

Labeling Schemes

In addition to the three interaction techniques, the labeling schemes may be varied to indicate orientation. First, Text labels may be used such as "Front" or "Left" to indicate a face view. In the List of buttons condition, combined views can be grouped (faces, edges and corners) and labeled with multiple terms such as "Top-Left" or "Front-Top-Right" for an edge and corner view respectively. The bottom portion of FIG. 15 illustrates such text labeling views. The cube conditions have multiple faces visible to specify combined views (see FIG. 12).

The 2D Graphics of a familiar object (e.g. a house) can be used to indicate orientation. The house is used in numerous 3D applications (see FIG. 11) to achieve standard views. The simplified house design consists of unique elements such as a door and chimney to make all faces look unique from each other. For the two cube conditions, two additional labeling schemes may be used. The 3D-Model condition embeds an actual 3D model of a miniature house within the cube (see FIG. 12) which acts as a proxy for the 3D scene. Finally, the experiment may include a No Labels on the cube option to emphasize relative navigation.

Difficulty Levels

To isolate the effect of easy view orientations (only face views such as "Top") and more challenging orientations (such as "Top-Front-Right"), two levels of target difficulty may be defined: Face-Views (the six [6] face views) and All-Views (all twenty-six [26] face, edge and corner views).

Task—Target Matching

Two shaded models of a car were shown to subjects; one in the left hand window (with an initial pseudo-random orientation) and one on the right (shown as the target orientation), as seen in upper portion of FIG. 15. The subject was asked to orient the car in their (left) window to match the orientation of the car (presented in the right window) using one of the orientation techniques mentioned above. On trials where the target was oriented to the top or the bottom of the car, an additional "roll" rotation step may be needed and the arrow buttons facilitated this action.

In the DragCube case, the orientations of the target car and subject's car were checked on mouse-up events, and if they matched, a "Trial Success" message was displayed. In the ClickCube and List cases, a mouse-up event initiates playback of an animated transition, after which matching is checked. Each trial continued until a match was achieved. After a pause of 3 seconds, the next trial would begin. A total of fifteen (15) trials were presented for each condition. For the All-Views condition, a subset of five (5) faces, five (5) edges, and five (5) corner target orientations were chosen. The first 3 trials of each condition were ignored to factor out subjects becoming familiar with the interface and condition. All subjects experienced the same orientation trials but in random order.

A total of eighteen (18) subjects were used (eight [8] men and ten [10] women) between the ages of 21 and 29. Roughly half of the subjects had 3D modeling or extensive video game experience. All subjects were experienced computer users. Before the start of the experiment, the subjects were briefly instructed on how each of the orientation techniques worked. Once comfortable, the subjects were asked to complete the tasks as quickly and as accurately as possible, allowing them to rest between conditions.

A within-subjects design was used with each subject using all three orientation techniques. This resulted in eighteen (18) subjects×three (3) techniques×four (4) labels×two (2) target difficulties×twelve (12) trials=5,184 data points. However, the List condition did not have the 3D-Model or the No Labels labeling conditions, thereby resulting in a total of 4,320 data points for the entire experiment. Trials were grouped by technique and counter balanced with ⅓ of the subjects using the List condition first, ⅓ using the ClickCube first and ⅓ using the DragCube first. The remaining factors were randomly presented to the subjects.

For every trial, the time for the subject to complete the trial was logged and the number of mouse clicks pressed was recorded. Errors were not possible as the system waited for a positive match before proceeding to the next trial. After completing the experiment, subjects were given a short questionnaire to determine their preferences for the three techniques and the four labeling schemes.

Results

Figure 16:
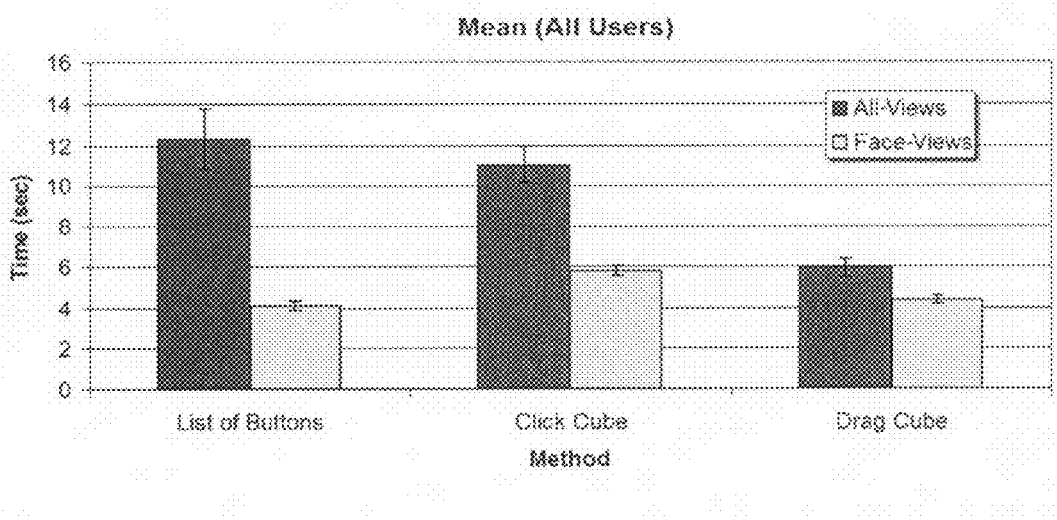
FIG. 16 illustrates a bar chart showing the mean (all users) compared to the different techniques in accordance with one or more embodiment of the invention.

An analysis of variance was performed on the performance data and a significant difference was found between the three techniques (List, ClickCube, and DragCube) with $F(2, 34)=74.20$, $p<0.0001$. The DragCube performance was 2.1 times faster than the List technique for the All-Views condition. No statistical significance in performance was found between the List and ClickCube techniques. FIG. 16 illustrates a bar chart showing the mean (all users) compared to the different techniques in accordance with one or more embodiment of the invention. The List and ClickCube had little difference from each other but the DragCube was almost twice as fast at the List method.

A significant difference was found for task difficulty with $F(1, 17)=289.73$, $p<0.0001$. That is, it took less time to orient to the six face viewpoints compared with the more complicated edge or corner viewpoints for all three techniques.

A significance interaction was found between orientation technique and task difficulty with values of $F(2, 34)=49.18$, $p<0.0001$ (see FIG. 16). However, there was no statistically significant performance difference based on the various labeling schemes (Text, 2D-Graphics, 3D-Model and No Labels). A pair-wise T-test of means ($p<0.05$) reveals no differences between the labeling schemes within a given orientation technique and task difficulty.

Figure 17:
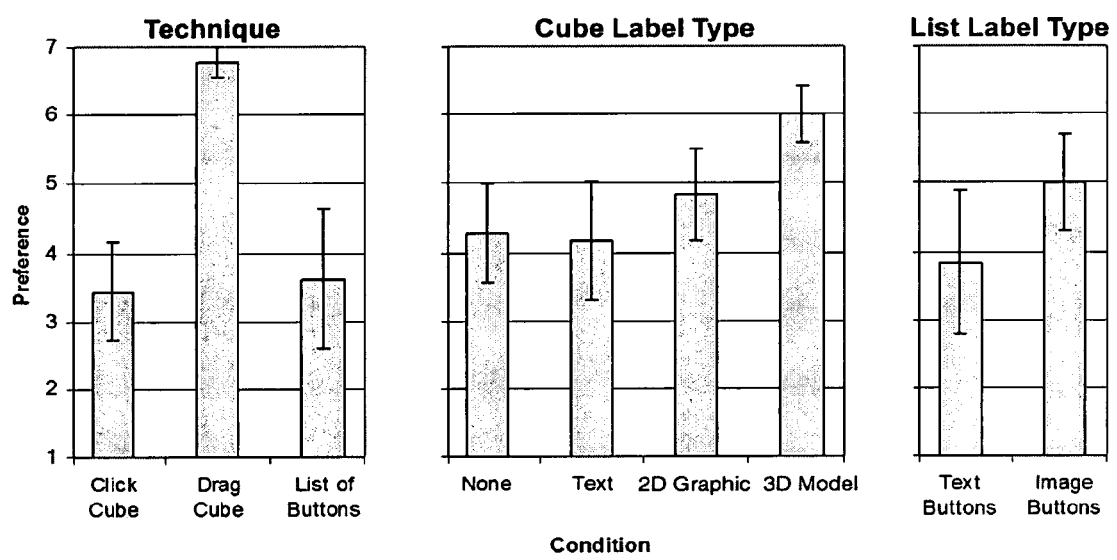
FIG. 17 illustrates a bar chart of the subject preferences in accordance with one or more embodiments of the invention.

Overall, consistent with the performance results, subjects had a much stronger preference for the DragCube compared to both the ClickCube and the List of buttons technique. The 3D-Model labeling scheme was preferred over other labeling schemes. Within the List condition, the 2D-Graphics were preferred over the Text labels (see FIG. 17). FIG. 17 illustrates a bar chart of the subject preferences showing the DragCube and the 3D Model label type were preferred, and the Image buttons were favored over the Text buttons.

Orientation Interaction Techniques

In the experiment described above, the DragCube greatly outperformed the ClickCube and List techniques. While significant benefits of cube dragging were expected, the factor of two (2) times speed increase and the consistency of results were impressive. When using the List method, especially with Text labels, the evidence shows the task to be significantly more difficult than in any other case. As such, it was surprising and unexpected that the ClickCube had no significant benefits over the List method. Such a result may be due to a planning phase of the interaction that is common to both the List and the ClickCube. In practice, before choosing a viewpoint with these two techniques, the user must consider which might be the correct button. Subjects could have used a fast random clicking strategy to complete the trials but the evidence has shown that, perhaps due to the cost of the animated transitions, subjects would plan their choices. However, the DragCube seems to afford immediate operation where the user completely forgoes any planning. If the users find that they are dragging in the "wrong" direction, they can switch directions very quickly and given the combination of a high C:D ratio and viewpoint snapping, can more easily match the target in a short period of time.

It is also interesting and unexpected that for the simple six viewpoint case, the DragCube was almost as fast as the short list of the six faces in the List. Furthermore, the DragCube scales from the six viewpoint case to the twenty-six viewpoint case far better than the other techniques. With the other two techniques, the twenty additional viewpoints grossly affected performance.

Despite the speed advantages of the DragCube, it may be shown that the ClickCube better supports novice users. When users first encounter a new widget, clicking seems to be a more common exploration method than initially dragging on a widget. As such, by supporting both clicking and dragging, both novice and advanced users can be accommodated. Another benefit of the ClickCube operation is the smooth animated transitions to the chosen viewpoint. This action creates a smoother visual flow while working. However, when dragging the DragCube, the quick model rotation is visually jarring but gives better performance.

Labeling Schemes

Since significant variance may be expected based on the labeling scheme, four cases were conducted in the experiment. In the DragCube case, the facts demonstrated that that label type had little effect because once the subject had clicked on the CubeCompass and started dragging, they would invariably switch to visually monitoring the jeep model—not the cube—to match it to the target. However, in the List and ClickCube cases, the subject's performance seems to vary to the individual's talent for interpreting text, for some people, or imagery for others; but in any case did not significantly vary the time taken to complete the task.

Logical Flow

Figure 18:
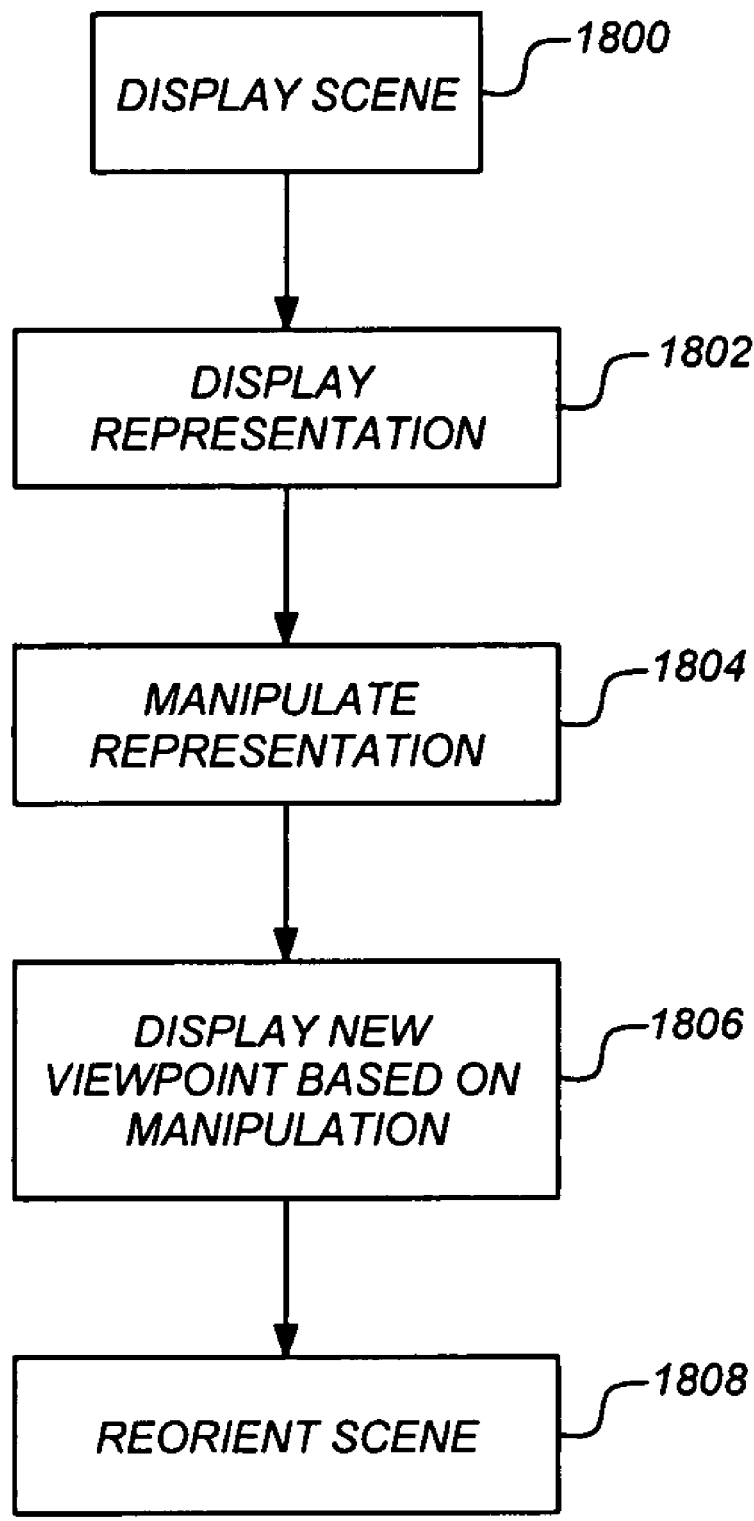
FIG. 18 illustrates the logical flow for controlling a three-dimensional (3D) scene view in accordance with one or more embodiments of the invention.

FIG. 18 illustrates the logical flow for controlling a three-dimensional (3D) scene view in accordance with one or more embodiments of the invention. At step 1800, a 3D scene having one or more 3D objects is displayed (e.g., on a display device by a graphics program).

At step 1802, a 3D representation of a coordinate system of the scene is displayed. The 3D representation has a current viewpoint and includes one or more faces, one or more edges, and one or more corners. Each face, edge, and corner of the representation represents a corresponding viewpoint of the scene. The 3D representation may take a variety of different shapes and encompass a variety of different numbers of viewpoints. An exemplary shape is that of a cube. Further, an exemplary number of viewpoints represented by the number of faces, edges, and corners is twenty-six (26).

The 3D representation may also be in a format that ensures the user can easily identify the different viewpoints represented. For example, the representation may have different text labels on each of the one or more faces. Alternatively (or in addition to the text labels), the 3D representation may comprise a 3D proxy model of a house or a miniature version of the 3D scene (or an object of the scene).

The displayed representation may also indicate the current viewpoint of the scene (e.g., by highlighting the corresponding viewpoint on the representation). For example, the current viewpoint may be darker, outlined, less transparent, etc. Further, the current viewpoint of the scene may be based on an object specific setting. In this regard, rather than basing the viewpoint on the entire scene, the viewpoint may vary when a particular object (e.g., a car) is selected (e.g., to change the Front viewpoint to that of the front of the car).

At step 1804, the representation is manipulated. As described above, the representation can be manipulated in a variety of different manners. In one or more embodiments, one of the faces, edges, or corners of the 3D representation is selected. In response, the invention automatically (and without further user input) snaps and reorients the representation to the selected face, edge, or corner. In this regard, the new current viewpoint of the representation becomes the selected face, edge or corner. In another embodiment, the 3D representation is rotated by dragging. For example, the user may utilize a cursor to drag the representation in the desired direction. As the user is dragging, when the viewpoint of the 3D representation is within a threshold (e.g., defined distance) of a face, edge, or corner, the invention automatically snaps the current viewpoint of the representation to the face, edge, or corner. In addition, the scene automatically reorients itself to the corresponding viewpoint of the representation.

Of particular note is that the scene may be rotated or updated dynamically as the representation is rotated. In this regard, the user may use the cube or representation to dynamically change the view of the scene.

The representation may also have indicators (e.g., arrows or a home icon) that points to orthogonal faces of the 3D representation. Such a display of indicators is part of the display of the representation at step 1802. In such an instance, the manipulation of the representation at step 1804 may include the ability to select one of the indicators thereby causing the viewpoint of the representation to rotate or be set to the orthogonal face based on the selected indicator.

At step 1806, a new current viewpoint of the representation is displayed based on the manipulation.

At step 1808, the scene is reoriented corresponding to the new current viewpoint and based on the manipulation of the 3D representation.

CONCLUSION

This concludes the description of the preferred embodiment of the invention. The following describes some alternative embodiments for accomplishing the present invention. For example, any type of computer, such as a mainframe, minicomputer, or personal computer, or computer configuration, such as a timesharing mainframe, local area network, or standalone personal computer, could be used with the present invention.

The present invention is concerned with desktop virtual environments operated with a standard mouse and keyboard. Despite the seemingly simple function of a viewpoint orientation indicator and controller, many subtleties in designing and evaluating a widget can accommodate a number of types of users and uses. These factors also play an important role in the overall user experience.

One or more embodiments of the invention provide a novel CubeCompass™ widget as a means for viewpoint switching between twenty-six (26) views as well as offering 3D orientation information. In this regard, the CubeCompass™ is a widget placed in a corner of the screen that displays the spatial relationship between viewpoints. Rotating the cube by either dragging on it, or clicking on the faces, edges, or corners rotates the scene to the corresponding viewpoint. Further such scene rotation occurs dynamically in real time as the cube is rotated.

Experimental results indicate that users prefer and are twice as fast at using the CubeCompass™ with dragging (to perform orbit operations with view snapping) compared to status-quo view switching techniques. No significant performance effects of varying the CubeCompass' labeling schemes (using text, 2D graphics, a 3D proxy model, or no labels). In the future, just as the 2D scrollbar facilitates 2D document navigation and orientation, we believe the CubeCompass could evolve towards a similar "3D scrollbar" for 3D environments.

The foregoing description of the preferred embodiment of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto.

REFERENCES

1. Balakrishnan, R. and Kurtenbach, G. (1999) Exploring bimanual camera control and object manipulation in 3D graphics interfaces. In *Proceedings of ACM CHI*. pp. 56-63.

2. Bares, W. and Kim, B. (2001) Generating Virtual Camera Compositions, In *Proceedings of ACM IUI'01*, pp. 9-12.

3. Bares, W. and Lester, J. C. (1999) Intelligent Multi-Shot Visualization Interfaces for Dynamic 3D Worlds. *Proceedings of ACM IUI '99*, pp. 119-126.

4. Baudisch, P., Cutrell, E., Hinckley, K., and Eversole, A. (2005) Snap-and-go: helping users align objects without the modality of traditional snapping. In *ACM Proceedings of the SIGCHI Conference on Human Factors in Computing Systems, CHI '05*, pp. 301-310.

5. Bier, E. A. (1990) Snap-dragging in three dimensions. In *ACM Proceedings of the 1990 Symposium on interactive 3D Graphics*, pp. 193-204.

6. Bowman, D., Johnson, D. and Hodges, L. (1999) Testbed environment of virtual environment interaction. In *Proceedings of ACM VRST*. pp. 26-33.

7. Bowman, D., Koller, D. and Hodges, F. H. (1997) Travel in immersive virtual environments. *IEEE VRAIS'97 Virtual Reality Annual International Symposium*. pp. 45-52.

8. Burtnyk, N., Khan, A., Fitzmaurice, G., Balakrishnan, R. and Kurtenbach, G. (2002) StyleCam: Interactive Stylized 3D Navigation using integrated Spatial and Temporal Controls, In *Proceedings of ACM UIST 2002*, pp. 101-110.

9. Burtnyk, N., Khan, A., Fitzmaurice, G., and Kurtenbach, G. (2006) ShowMotion: camera motion based 3D design review. In *Proceedings of the 2006 Symposium on interactive 3D Graphics and Games*, SI3D '06, pp. 167-174.

10. Chapuis, O. and Roussel, N. (2005) Metisse is not a 3D desktop!. In *Proceedings of the 18th Annual ACM Symposium on User interface Software and Technology*, UIST '05, pp. 13-22.

11. Chittaro, L. and Burigat, S. (2004) 3D location-pointing as a navigation aid in Virtual Environments. In *ACM Proceedings of the Working Conference on Advanced Visual interfaces* (Gallipoli, Italy, May 25-28, 2004). AVI '04, pp. 267-274.

12. Christianson, D. B., Anderson, S. E., He, L.-W., Weld, D. S., Cohen, M. F., and Salesin, D. H. (1996) Declarative camera control for automatic cinematography. *Proceedings of AAAI '96* (Portland, Oreg.), pp. 148-155.

13. Drucker, S. and Zeltzer, D. (1995) CamDroid: A System for Implementing Intelligent Camera Control. In *Proceedings of ACM Symposium on Interactive 3D Graphics*, pp. 139-144.

14. Galyean, T. (1995) Guided navigation of virtual environments. *ACM Symposium on Interactive 3D Graphics*. pp. 103-104.

15. Gliecher, M. and Witkin, A. (1992) Through-the-lens camera control. *ACM SIGGRAPH 92*. pp. 331-340.

16. Grossman, T., Balakrishnan, R., Kurtenbach, G., Fitzmaurice, G., Khan, A., and Buxton, B. (2001) Interaction techniques for 3D modeling on large displays. In *Proceedings of the 2001 Symposium on interactive 3D Graphics* SI3D '01, pp. 17-23.

17. Hanson, A. and Wernet, E. (1997) Constrained 3D navigation with 2D controllers. *IEEE Visulization*. pp. 175-182.

18. He, L., Cohen, M. and Salesin, D. (1996) The virtual cinematographer: a paradigm for automatic real-time camera control and directing. *ACM SIGGRAPH 96*. pp. 217-224.

19. Henderson, D. A. and Card, S. (1986) Rooms: the use of multiple virtual workspaces to reduce space contention in a window-based graphical user interface. ACM Transactions on Graphics (TOG), 5(3), pp. 211-243.

20. Igarashi, T., Kadobayashi, R., Mase, K. and Tanaka, H. (1998) Path drawing for 3D walkthrough. *ACM UIST*. pp. 173-174.

21. Jul, S., & Furnas, G. (1998) Critical zones in desert fog: aids to multiscale navigation. *ACM Symposium on User Interface Software and Technology*. pp. 97-106.

22. Khan, A. Komalo, B., Stam, J., Fitzmaurice, G. and Kurtenbach, G. (2005) HoverCam: interactive 3D navigation for proximal object inspection, In *Proceedings of ACM Symposium on Interactive 3D graphics and games*, pp. 73-80.

23. Komerska, R. and Ware, C. (2003) "Haptic-GeoZui3D: Exploring the Use of Haptics in AUV Path Planning", *Proceedings 13th International Symposium on Unmanned Untethered Submersible Technology (UUST'03)*, Durham, N.H.

24. Mackinlay, J., Card, S. and Robertson, G. (1990) Rapid controlled movement through a virtual 3D workspace. *ACM SIGGRAPH 90*. pp. 171-176.

25. Phillips, C. B., Badler, N. I., and Granieri, J. (1992) Automatic Viewing Control for 3D Direct Manipulation. In *ACM Proceedings of ACM Symposium on Interactive 3D Graphics*, pp. 71-74.

26. Pierce, J. S., Conway, M., van Dantzich, M., and Robertson, G. (1999) Toolspaces and glances: storing, accessing, and retrieving objects in 3D desktop applications. In *ACM Proceedings of the 1999 Symposium on interactive 3D Graphics*, SI3D, pp. 163-168.

27. Rezzonico, S. and Thalmann, D. (1996) Browsing 3D Bookmarks in BED, WebNet 1996.

28. Robertson, G., Card, S. K., and Mackinlay, J. D. (1989) The cognitive coprocessor architecture for interactive user interfaces, In *Proceedings of ACM UIST 1989*, pp 10-18.

29. Singh, K. and Balakrishnan, R. (2004) Visualizing 3D Scenes using Non-Linear Projections and Data Mining of Previous Camera Moves. In *Proceedings of ACM Computer Graphics, Virtual Reality, Visualization and Interaction in Africa*, pp. 41-48.

30. Smith, G., Salzman, T., & Stuerzlinger, W. (2001) 3D Scene Manipulation with 2D Devices and Constraints. *Proceedings of Graphics Interface*, pp. 135-142.

31. Steed, A. (1997) Efficient navigation around complex virtual environments. *ACM VRST*. pp. 173-180.

32. Stoakley, R., Conway, M. and Pausch, R. (1995) Virtual reality on a WIM: Interactive worlds in miniature. *ACM CHI*. pp. 265-272.

33. Stoev, S. L. and Straber, W. (2002) A Case Study on Automatic Camera Placement and Motion for Visualizing Historical Data. *Proceedings of IEEE Visualization*, pp. 545-558.

34. Tan, D., Robertson, G. and Czerwinski, M. (2001) Exploring 3D navigation: combining speed-coupled flying with orbiting. *ACM CHI*. pp. 418-425.

35. Tory, M. (2003) Mental Registration of 2D and 3D Visualizations (An Empirical Study). In *Proceedings of the 14th IEEE Visualization* 2003 (Vis'03) pp. 371-379.

36. Tory, M. and Swindells, C. (2003) Comparing ExoVis, Orientation Icon, and In-Place 3D Visualization Techniques. In *Proceedings of Graphics Interface*, pp. 57-64.

37. Tory, M., Moller, T., Atkins, M. S., and Kirkpatrick, A. E. (2004) Combining 2D and 3D views for orientation and relative position tasks. In *ACM Proceedings of the SIGCHI Conference on Human Factors in Computing Systems*, CHI '04, pp. 73-80.

38. Wan, M., Dachille, F. and Kaufman, A. (2001) Distance-Field Based Skeletons for Virtual Navigation. *IEEE Visualization* 2001. pp. 239-245.

39. Ware, C. and Fleet, D. (1997) Context sensitive flying interface. *ACM Symposium on Interactive 3D Graphics*. pp. 127-130.

40. Ware, C. and Osborne, S. (1990) Exploration and virtual camera control in virtual three dimensional environments. *ACM Symposium on Interactive 3D Graphics*. pp. 175-183.

41. Zeleznik, R. and Forsberg, A. (1999) UniCam-2D Gestural Camera Controls for 3D Environments. ACM Symposium on Interactive 3D Graphics. 169-173.

42. Zeleznik, R., Forsberg, A. And Strauss, P. (1997) Two pointer input for 3D interaction. *ACM Symposium on Interactive 3D Graphics*. pp. 115-120.

What is claimed is:

1. A computer implemented method for controlling a three-dimensional scene view, comprising:
    (a) displaying, using a computer, a three-dimensional (3D) scene having one or more three-dimensional objects;
    (b) displaying, using the computer, a 3D representation of a coordinate system of the scene, wherein the 3D representation:
        (i) comprises a current viewpoint; and
        (ii) comprises one or more faces, one or more edges, and one or more corners,
    wherein each face, edge, and corner represents a selectable corresponding viewpoint of the scene;
    (c) manipulating, using the computer, the 3D representation, wherein such manipulation selects one of the selectable corresponding viewpoints as a new current viewpoint;
    (d) displaying, using the computer, the new current viewpoint of the 3D representation based on the manipulation; and
    (d) reorienting, using the computer, the scene corresponding to the new current viewpoint based on the manipulation of the 3D representation.

2. The method of claim 1, wherein the 3D representation comprises a cube.

3. The method of claim 1, wherein the 3D representation represents at least twenty-six (26) viewpoints of the scene.

4. The method of claim 1, wherein the manipulating the 3D representation, displaying the new current viewpoint, and reorienting the scene comprises:
    selecting one of the faces, edges, or corners of the 3D representation;
    the new current viewpoint comprises the selected face, edge, or corner of the 3D representation;
    automatically snapping and reorienting the new current viewpoint of the 3D representation to the selected face, edge, or corner; and
    automatically reorienting the scene to the corresponding new current viewpoint of the 3D representation.

5. The method of claim 1, wherein manipulating the 3D representation comprises:
    (a) rotating the 3D representation by dragging the 3D representation;
    (b) when the new current viewpoint of the 3D representation is within a threshold of a face, edge, or corner of the 3D representation:
        (i) automatically snapping and reorienting the new current viewpoint of the 3D representation to the face, edge, or corner; and
        (ii) automatically reorienting the 3D scene to the corresponding new current viewpoint of the 3D representation.

6. The method of claim 1, further comprising:
    (a) displaying one or more indicators pointing to orthogonal faces of the 3D representation; and
    (b) wherein manipulating the 3D representation comprises:
        (i) selecting one of the indicators; and
        (ii) the new current viewpoint of the 3D representation is set to the orthogonal face based on the selected indicator.

7. The method of claim 1, wherein the 3D representation comprises different text labels on each of the one or more faces.

8. The method of claim 1, wherein the 3D representation comprises a 3D proxy model of a house.

9. The method of claim 1, further comprising highlighting the current viewpoint of the 3D representation.

10. The method of claim 1, wherein the current viewpoint of the scene is based on an object specific setting.

11. An apparatus for controlling a three-dimensional scene view in a computer system comprising:
    (a) a computer having a memory;
    (b) an application executing on the computer, wherein the application is configured to
        (i) display a three-dimensional (3D) scene having one or more three-dimensional objects;
        (ii) display a 3D representation of a coordinate system of the scene, wherein the 3D representation comprises:
            (1) a current viewpoint; and
            (2) one or more faces, one or more edges, and one or more corners, wherein each face, edge, and corner represents a selectable corresponding viewpoint of the scene;
        (iii) manipulate the 3D representation, wherein such manipulation selects one of the selectable corresponding viewpoints as a new current viewpoint;
        (iv) display the new current viewpoint of the 3D representation based on the manipulation; and
        (v) reorient the scene corresponding to the new current viewpoint based on the manipulation of the 3D representation.

12. The apparatus of claim 11, wherein the 3D representation comprises a cube.

13. The apparatus of claim 11, wherein the 3D representation represents at least twenty-six (26) viewpoints of the scene.

14. The apparatus of claim 11, wherein the application is configured to manipulate the 3D representation, display the new current viewpoint, and reorient the scene by:
    selecting one of the faces, edges, or corners of the 3D representation;

the new current viewpoint comprises the selected face, edge, or corner of the 3D representation;

automatically snapping and reorienting the new current viewpoint of the 3D representation; to the selected face, edge, or corner; and automatically reorienting the scene to the corresponding new current viewpoint of the 3D representation.

15. The apparatus of claim 11, wherein the application is configured to manipulate the 3D representation by:
   (a) rotating the 3D representation by dragging the 3D representation;
   (b) when the new current viewpoint of the 3D representation is within a threshold of a face, edge, or corner of the 3D representation:
      (i) automatically snapping and reorienting the new current viewpoint of the 3D representation to the face, edge, or corner; and
      (ii) automatically reorienting the 3D scene to the corresponding new current viewpoint of the 3D representation.

16. The apparatus of claim 11, wherein the application is further configured to:
   (a) display one or more indicators pointing to orthogonal faces of the 3D representation; and
   (b) wherein the application is configured to manipulate the 3D representation by:
      (i) selecting one of the indicators; and
      (ii) the new current viewpoint of the 3D representation is set to the orthogonal face based on the selected indicator.

17. The apparatus of claim 11, wherein the 3D representation comprises different text labels on each of the one or more faces.

18. The apparatus of claim 11, wherein the 3D representation comprises a 3D proxy model of a house.

19. The apparatus of claim 11, wherein the application is further configured to highlight the current viewpoint of the 3D representation.

20. The apparatus of claim 11, wherein the current viewpoint of the scene is based on an object specific setting.

21. An article of manufacture comprising a program non-transitory storage medium readable by a computer and embodying one or more instructions executable by the computer to perform a method for controlling a three-dimensional scene view, wherein the method comprises:
   (a) displaying a three-dimensional (3D) scene having one or more three-dimensional objects;
   (b) displaying a 3D representation of a coordinate system of the scene, wherein the 3D representation comprises:
      (i) a current viewpoint; and
      (ii) one or more faces, one or more edges, and one or more corners,
   wherein each face, edge, and corner represents a selectable corresponding viewpoint of the scene;
   (c) manipulating the 3D representation, wherein such manipulating selects one of the selectable corresponding viewpoints as a new current viewpoint;
   (d) displaying the new current viewpoint of the 3D representation based on the manipulation; and
   (d) reorienting the scene corresponding to the new current viewpoint based on the manipulation of the 3D representation.

22. The article of manufacture of claim 21, wherein the 3D representation comprises a cube.

23. The article of manufacture of claim 21, wherein the 3D representation represents at least twenty-six (26) viewpoints of the scene.

24. The article of manufacture of claim 21, wherein the manipulating the 3D representation, displaying the new current viewpoint, and reorienting the scene comprises:
   selecting one of the faces, edges, or corners of the 3D representation;
   the new current viewpoint comprises the selected face, edge, or corner of the 3D representation;
   automatically snapping and reorienting the new current viewpoint of the 3D representation to the selected face, edge, or corner; and
   automatically reorienting the scene to the corresponding new current viewpoint of the 3D representation.

25. The article of manufacture of claim 21, wherein manipulating the 3D representation comprises:
   (a) rotating the 3D representation by dragging the 3D representation;
   (b) when the new current viewpoint of the 3D representation is within a threshold of a face, edge, or corner of the 3D representation:
      (i) automatically snapping and reorienting the new current viewpoint of the 3D representation to the face, edge, or corner; and
      (ii) automatically reorienting the 3D scene to the corresponding new current viewpoint of the 3D representation.

26. The article of manufacture of claim 21, wherein the method further comprises:
   (a) displaying one or more indicators pointing to orthogonal faces of the 3D representation; and
   (b) wherein manipulating the 3D representation comprises:
      (i) selecting one of the indicators; and
      (ii) the new current viewpoint of the 3D representation is set to the orthogonal face based on the selected indicator.

27. The article of manufacture of claim 21, wherein the 3D representation comprises different text labels on each of the one or more faces.

28. The article of manufacture of claim 21, wherein the 3D representation comprises a 3D proxy model of a house.

29. The article of manufacture of claim 21, wherein the method further comprises highlighting the current viewpoint of the 3D representation.

30. The article of manufacture of claim 21, wherein the current viewpoint of the scene is based on an object specific setting.

* * * * *